(12) United States Patent
Cotton et al.

(10) Patent No.: US 9,667,643 B2
(45) Date of Patent: May 30, 2017

(54) APPARATUS, SYSTEM, AND METHOD FOR CORRELATING SECURITY VULNERABILITIES FROM MULTIPLE INDEPENDENT VULNERABILITY ASSESSMENT METHODS

(71) Applicant: Digital Defense Incorporated, San Antonio, TX (US)

(72) Inventors: Mike Cotton, San Antonio, TX (US); Michael Cosby, San Antonio, TX (US); Gordon Mackay, San Antonio, TX (US); Brandon Shilling, San Antonio, TX (US)

(73) Assignee: Digital Defense Incorporated, San Antonio, TX (US)

( * ) Notice: Subject to any disclaimer, the term of this patent is extended or adjusted under 35 U.S.C. 154(b) by 0 days.

(21) Appl. No.: 14/243,842

(22) Filed: Apr. 2, 2014

(65) Prior Publication Data

US 2015/0237063 A1 Aug. 20, 2015

Related U.S. Application Data

(60) Provisional application No. 61/942,182, filed on Feb. 20, 2014.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC ........... H04L 1/24; G06F 11/36; H04W 12/00
See application file for complete search history.

(56) References Cited

U.S. PATENT DOCUMENTS

| | | | |
|---|---|---|---|
| 8,800,045 B2* | 8/2014 | Curtis et al. ..................... | 726/25 |
| 8,844,043 B2* | 9/2014 | Williams .............. | G06F 21/577 |
| | | | 713/189 |
| 2006/0265746 A1 | 11/2006 | Farley et al. | |
| 2009/0259748 A1 | 10/2009 | McClure et al. | |
| 2009/0316587 A1 | 12/2009 | Omar | |
| 2011/0289580 A1 | 11/2011 | Onuma | |
| 2012/0210434 A1* | 8/2012 | Curtis ................... | G06F 21/577 |
| | | | 726/25 |
| 2012/0260344 A1 | 10/2012 | Maor et al. | |

* cited by examiner

*Primary Examiner* — Joseph P Hirl
*Assistant Examiner* — Leynna Truvan
(74) *Attorney, Agent, or Firm* — Norton Rose Fulbright US LLP

(57) ABSTRACT

The present disclosure relates to methods for correlating security vulnerability assessment data from a network vulnerability assessment, a static application security test (SAST) assessment and/or a zero day vulnerability metadata source.

4 Claims, 22 Drawing Sheets

Test Ready Queue 700

| T3 | T4 |  |  |  |  |  |  |
|----|----|--|--|--|--|--|--|
| C1 | C4 |  |  |  |  |  |  |

FIG. 7A

Test Run List 701

|  |  |  |  |  |  |  |  |
|--|--|--|--|--|--|--|--|

FIG. 7B

Test Context Launch Table 702

| T1 | T2 |  |  |  |  |  |  |

| C1 | C2 | C3 |  |  |  |  |  |

| C1 | C2 | C3 |  |  |  |  |  |

FIG. 7C

Event to Test Dependency Table 703

| e1 | → | T1 | T2 | T3 |
| e2 | → | T2 | T5 |    |
| e3 | → | T3 | T5 | T7 |

FIG. 7D

Test to Event Dependency Table 704

| T1 | $e1*e4 + e6*e7$ |
|----|-----------------|
| T2 | $e1 + e2$       |
| T3 | $e1 + e3$       |

FIG. 7E

Scan Context Level Event Completion Table 705

| Scan Start | True |
|---|---|
| KEY-a | VAL-a |
| KEY-b | VAL-b |

FIG. 7F

Host Context Level Event Completion Table 706

| IPa | → | OS | Windows |
|---|---|---|---|
|  |  | Hostname | Bob |
|  |  | KEY-c | VAL-c |
| IPb |  |  |  |
| IPc | → | OS | Linux |
|  |  | Hostname | Sam |
|  |  | KEY-c | VAL-c |

FIG. 7G

Service Context Level Event Completion Table 707

| KEY | → | Protocol | TCP |
|---|---|---|---|
|  |  | Tunnel | SSL |
|  |  | KEY-c | VAL-c |
| KEY |  |  |  |
| KEY | → | Protocol | ICMP |
|  |  | KEY-b | VAL-b |
|  |  | KEY-c | VAL-c |

FIG. 7H

Application Context Level Event Completion Table 708

| KEY | → | Vendor | Windows |
|---|---|---|---|
|  |  | Version | 2002 |
|  |  | KEY-c | VAL-c |
| KEY |  |  |  |
| KEY | → | KEY-a | VAL-a |
|  |  | KEY-b | VAL-b |
|  |  | KEY-c | VAL-c |

FIG. 7I

Vulnerability Context Level Event Completion Table 709

| KEY | → | Data | binary |
|---|---|---|---|
|  |  | Method | Remote |
|  |  | KEY-c | VAL-c |
| KEY |  |  |  |
| KEY | → | KEY-a | VAL-a |
|  |  | KEY-b | VAL-b |
|  |  | KEY-c | VAL-c |

FIG. 7J

APPARATUS, SYSTEM, AND METHOD FOR CORRELATING SECURITY VULNERABILITIES FROM MULTIPLE INDEPENDENT VULNERABILITY ASSESSMENT METHODS

PRIORITY CLAIM

This application claims priority to U.S. Provisional Patent Application No. 61/942,182 filed Feb. 20, 2014, which is incorporated reference in its entirety.

BACKGROUND OF THE INVENTION

Field of the Invention

The present invention relates to network security and more particularly to an apparatus, system, and method for reconciling security vulnerabilities identified by multiple independent methods including a Network Vulnerability Assessment tool, a Static Application Security Testing tool and Zero Day Vulnerability Metadata data source.

Description of the Related Art

Cyber security threats have evolved over time. Given the breadth of various types of threats and attacks, there is no one single vulnerability assessment technology that is capable of detecting every types of vulnerability.

Small to medium sized organizations often resort to only one vulnerability assessment technology due to the cost of employing more than one assessment method and also due to the challenge of reconciling the data from the various independent assessment technologies. Larger Organizations have occasionally used multiple vulnerability assessment tools, but are then faced with the vulnerability data reconciliation challenge. Organizations are therefore faced with either a single solution with limited vulnerability assessment coverage or a solution that employs multiple independent technologies resulting in better vulnerability assessment coverage but having an unsolved matching problem which ultimately leads to a misunderstanding of their risk contributed by the vulnerabilities.

Security Information and Event Management—SIEM technologies allow sourcing of security data from any security tool that has some form of external interface that provides access to a given tool's security information. SIEM tools are among the few technologies within the internet security marketplace that have attempted to merge multiple security information related data sets. However these existing SIEM technologies typically employ limited automated data reconciliation intelligence and which is not vulnerability data centric but instead only attempts to match the computer elements that each data set brings into the SIEM. Even then, the reconciliation technology employed within the existing SIEMs in the marketplace employ limited rule-sets to match the network hosts from the various independent data sets. Realizing that a given vulnerability may be discovered separately by several selected technologies, determining the true set of unique vulnerabilities that has been detected by the various independent technologies may be useful to determine the vulnerabilities contributing to the true security risk of the network devices for which the vulnerabilities pertain.

BRIEF SUMMARY OF ASPECTS OF THE INVENTION

A method is presented. In some embodiments, the method includes receiving in computer memory a SAST assessment for a software application, wherein the SAST assessment comprises at least one CWE-ID. The method may further include performing a network vulnerability scan on a host running the software application and creating a network vulnerability assessment based on the results of the network vulnerability scan. The network vulnerability assessment may include a CVE-ID. The method may include correlating at least one item in the SAST assessment with at least one item in the network vulnerability assessment.

In some embodiments, the methods presented may include identifying a CWE-ID associated with the at least one CVE-ID and matching the at least one CVE-ID from the SAST assessment with the at least one CVE-ID associated with the at least one CWE-ID from the network vulnerability assessment. In some embodiments, the SAST assessment is requested and received using an application program interface that interfaces with a remote computer system. Furthermore, the matched CVE-IDs may be identical. Furthermore, the identity of a CWE-ID associated with at least one CVE-ID is received from a remote computer system.

In some embodiments of the methods presented herein, the method may include receiving in computer memory a SAST assessment for a software application and receiving in computer memory the software application that has been instrumented based on the SAST assessment. The method may also include loading the instrumented software application on a network host and executing the instrumented software application on the network host. In addition, the method may include performing a network vulnerability scan on the network host and creating a network vulnerability assessment based on the results of the network vulnerability scan. In some embodiments, the method may include receiving in computer memory at least one output from an instrumented portion of the software application. In addition, the method may include correlating at least one item in the SAST assessment with at least one item in the network vulnerability assessment based on the at least one output.

In some embodiments, the method may include instrumenting the software application by inserting at least one instruction in the software application. Furthermore, the method may include an output from and instrumented portion of the software application that is outputted when the instrumented portion of the software application is executed on the network host. In some embodiments the output is an entry in a log file on the network host. Furthermore, the entry in the log file may identify a location of the instrumented portion within the software application. In some embodiments, the location of the software application may be identified by line number. Furthermore, correlating at least one item in the SAST assessment with at least one item in the network vulnerability assessment may be performed by associating the location if the instrumented and executed portion of the software application, as determined by the entry in the log file, and a test program performed during the network vulnerability scan.

Non-transitory computer-readable media are also presented that include instructions, that when executed by a processor, cause a processor to perform the methods described herein.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented below.

FIGS. 7A-7J are data structures that may be used in a scanner engine.

DETAILED DESCRIPTION

Various features and advantageous details are explained more fully with reference to the nonlimiting embodiments that are illustrated in the accompanying figures and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
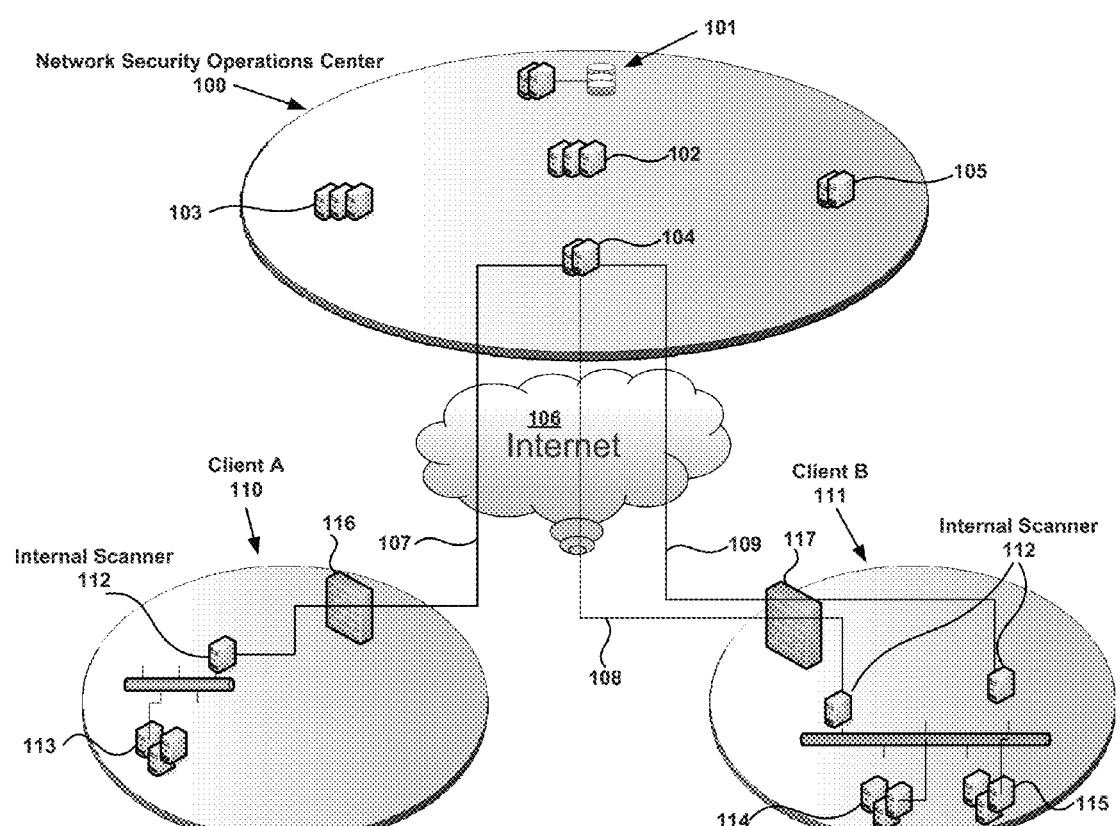
FIG. 1 is a schematic block diagram of a Vulnerability Management System comprising a Network Security Operations Center and Scanner System.

FIG. 1 illustrates a high-level view of a network implementing one embodiment of a multi-context event streaming network vulnerability scanner employing network host reconciliation. The system includes a Network Security Operations Center ("NSOC") 100 and vulnerability scanners 112 located at the premises of Client A 110 and Client B 111. In some embodiments, all functionality contained within the NSOC 100 may be combined within one device and may be located within a given client premise for use solely by a given client.

In this embodiment the NSOC 100 includes a Database Complex 101, a Business Logic Complex 102, Web Complex 103, Scanner Orchestration and Message Gateway Complex 104 and also includes a bank of remote vulnerability scanners 105. The remote vulnerability scanners 105 may serve to assess a client's external security posture whereas a vulnerability scanner 112 located at a client's premises may serve to assess the client's internal security posture. Remote vulnerability scanners 105 located within the NSOC 100 may be identical to vulnerability scanners 112. Client information including vulnerability data is stored within Database Complex 101. Database Complex 101 may be a collection of computers and/or software that stores information. In some embodiments, Database Complex 101 may reside in a plurality of different locations. Business Logic Complex 102 may include a set of servers that provide a set of services to Web Complex 103 and to Scanner Orchestration and Message Gateway Complex 104. For example, Business Logic Complex 102 may access and update client vulnerability data from/to Database Complex 101. Business Logic Complex 102 may also serve as a gatekeeper for the Database Complex and a control center for scanners 112 and 105. The Business Logic Complex 102 may also comprise a continually running process implementing the network host reconciliation which is responsible for reconciling point in time network assessment hosts to network assets tracked by the NSOC 100.

Web Complex 103 includes a web server that serves up web pages over a portal. It may also be used to render various vulnerability assessment and vulnerability management reports. Web Complex 103 may allow client users to schedule their vulnerability assessments, view and manage their results remotely over the internet 106, and obtain scan reports. Web Complex 103 may call services from Business Logic Complex 102 to obtain the data required to create reports requested by a client user over the portal. Scanner Orchestrator and Message Gateway Complex 104 performs at least two functions. First, it may act as an orchestrator for scanner activities such as initiating a scan launch when given scan schedules arrive from the Business Logic Complex. Second, it launches scans on scanners both for external and internal assessments as well as reporting scan results to the Business Logic Complex 102. In addition, Scanner Orchestrator and Message Gateway Complex 104 may serve as a secure message gateway for at least some of the scanners located both within NSOC 100 and at client premise locations 110 and 111.

In this embodiment, scanners 112 initiate secure connections 107, 108, and 109 to Scanner Orchestrator and Message Gateway Complex 104. A secure connection may help ensure the confidentiality of messages sent to and from the scanners. In some embodiments, the secure connection is achieved using SSH or SSL over the Internet 106. External scanners 105 may send traffic to client internet-facing devices for the purpose of performing external vulnerability assessments. Internal scanners 112 may actively send packets to network-connected devices 113, 114, and 115 that they are scanning for the purpose of performing internal vulnerability assessments. The results discovered via these assessments may be sent over the secure channel (e.g., 107, 108, or 109) to Scanner Orchestrator and Message Gateway Complex 104, where they are written into Database Complex 101 by calling services in Business Logic Complex 102. In FIG. 1, Client A 110 and Client B 111 have firewalls 116 and 117, respectively. Scanners 112 are located behind firewalls 116 and 117, which allow them to conduct internal vulnerability scans. By contrast, scanner 105 is located outside firewalls 116, and 117, and is only able to conduct an external vulnerability scan.

Although the embodiment of the NSOC 100 described in FIG. 1 is shown as having different components that perform different functions, the system may be implemented in as little as one computer that implements one or more of the described functions.

NSOC to Scanner Interaction

Figure 2:
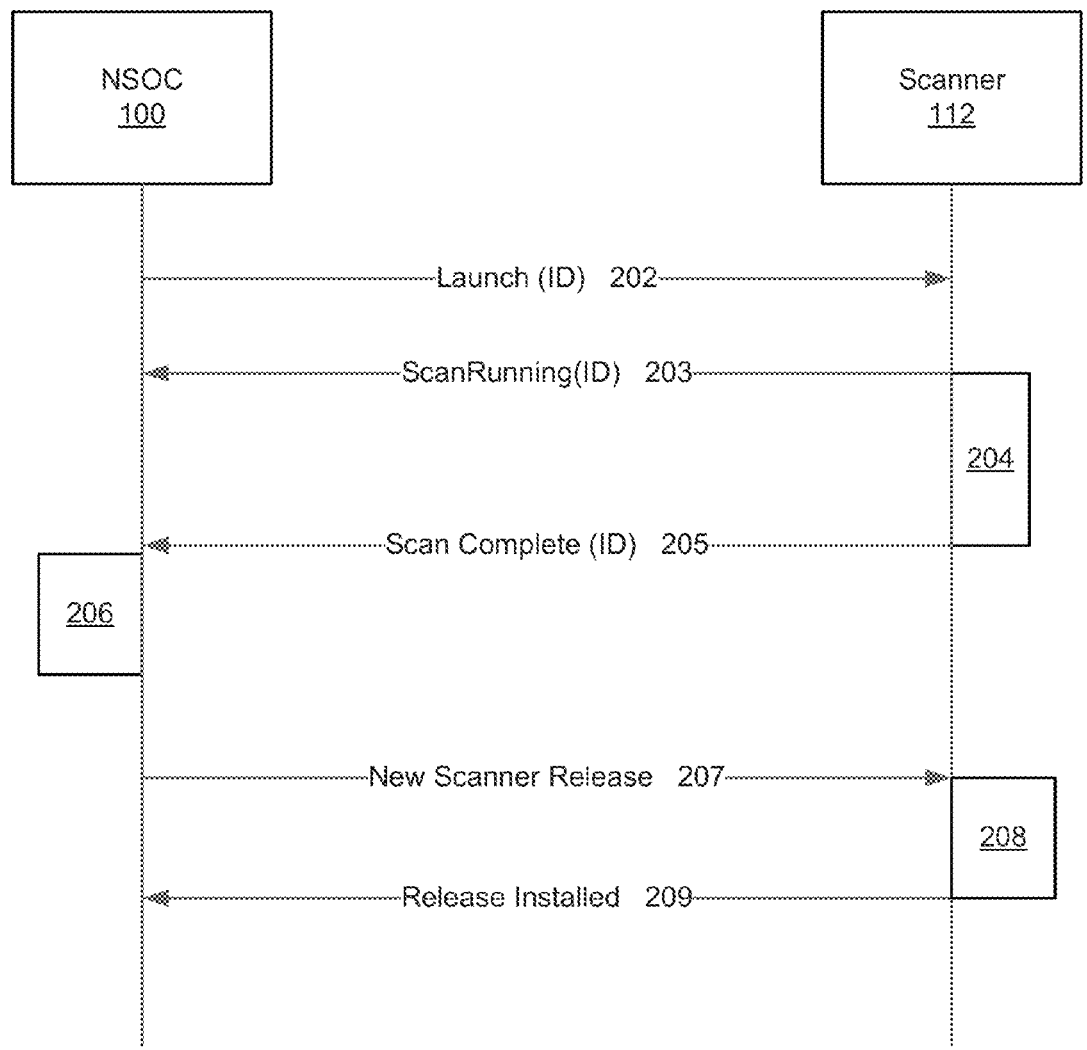
FIG. 2 is a process flow diagram showing the interaction between a network security operations center and a network scanner.

FIG. 2 illustrates the interaction between NSOC 100 and a scanner 112. The figure illustrates the activities that occur at the point in time where NSOC 100 has determined that it is time to launch a scan on a given scanner. At that time, a Launch message 202 is sent to the scanner 112. Message 202 contains information that the scan requires to launch such as, for example, an identifier ID, IP address ranges, or configuration information such as scan speed setting. The scanner 112 replies to NSOC 100 to signal that it has received the message with a ScanRunning message 203 that includes the identifier ID that, for example, was previously sent within the launch message. In some embodiments, this allows NSOC 100 to set the state of the scan into a running state within NSOC 100 database for the given scan launch that was requested. The scanner 112 proceeds to run the scan 204. In some embodiments, a scan includes a plurality of test programs. When the scan completes, the scanner 112 sends the results back to NSOC 100 within a Scan Complete message 205, which may contain the scan identifier ID as well as the scan results 206. NSOC 100 then inserts scan results 206 into Database Complex 101.

As new threats are discovered or as scanning techniques advance, the disclosed system may support the ability to add and update the test programs that detect vulnerabilities. To achieve this, test programs may be packaged into a scanner release file and deposited into Scanner Orchestrator and Message Gateway Complex 104 within NSOC 100. A process within this complex sends the new release to the scanners in the form of a New Scanner Release 207 message. When the scanner receives this, it installs the new test programs on its disk 208 where they will then be available to execute. The scanner 112 may then send a Release Installed message 209 indicating that the scanner 112 has the new release of test programs.

Scanner Software Layering

Figure 3:
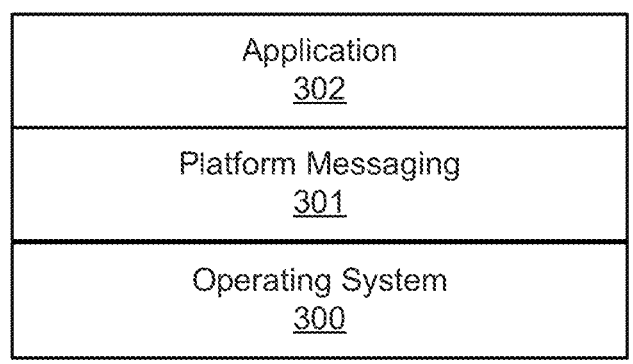
FIG. 3 is a schematic block diagram showing network layers of a network scanner node.

FIG. 3 illustrates the high level software architecture of one embodiment of a scanner 112. The scanner 112 hardware may include an off the shelf computer in the form of a small desktop or in the form of a rack-mount computer with one or more CPUs, random access memory, hard disk storage, a network interface that allows the computer to send and receive data over a computer network, and an optional monitor and keyboard (or other data input device). Internally, the scanner 112 may include a software stack that includes an Operating System 300, a Platform Messaging software layer 301, and an Application layer 302. Examples of the Operating System 300 include Microsoft Windows, such as Windows Server 2008, and Linux, such as SuSe Linux. Platform Messaging layer 301 is responsible for establishing a secure connection to NSOC 100 and is the conduit for all NSOC 100 to scanner 112 messages. Application layer 302 is responsible for executing the vulnerability assessment software, which includes at least one vulnerability assessment engine and vulnerability assessment test programs.

Scanner Software Architecture

Figure 4:
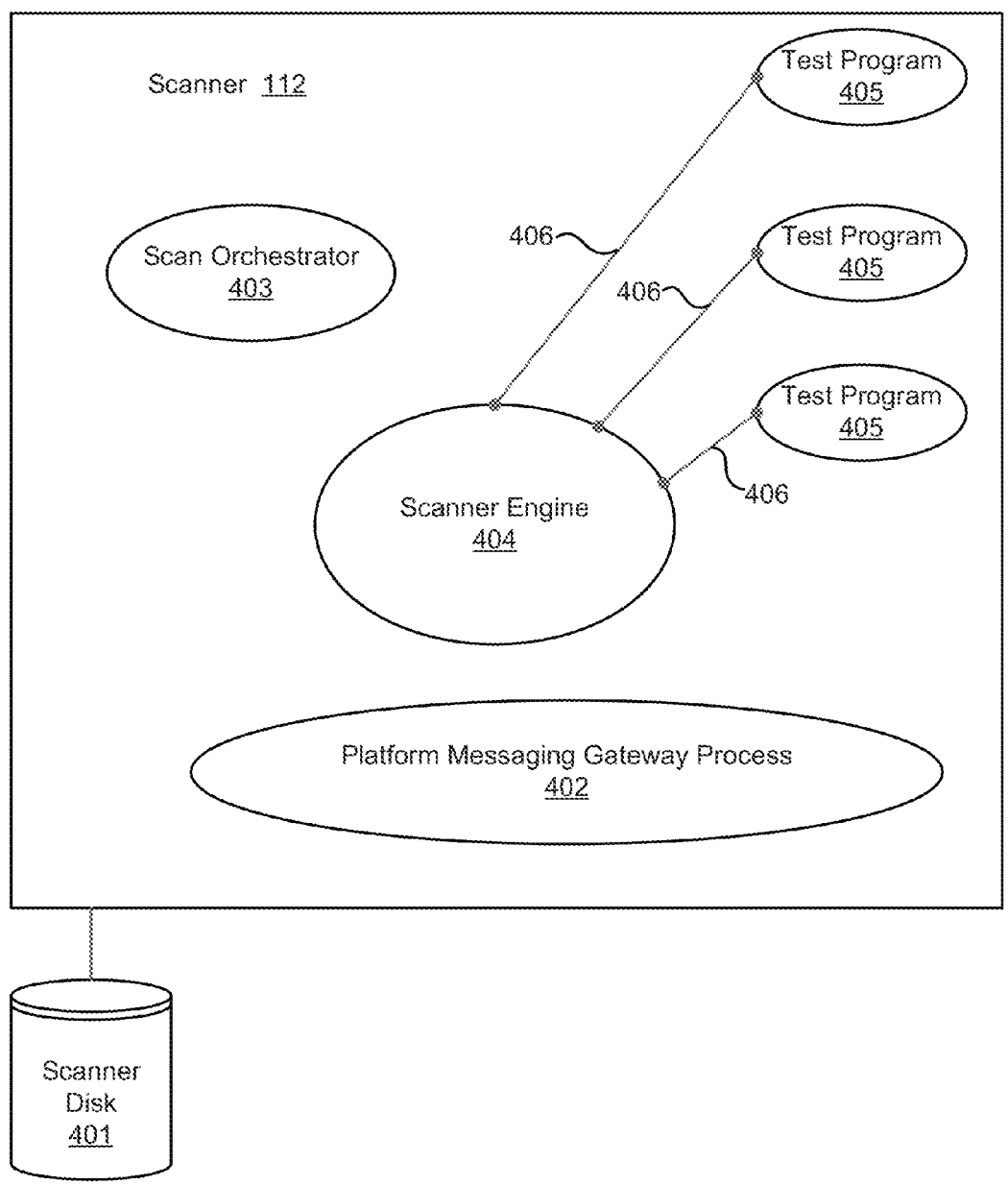
FIG. 4 is a schematic block diagram of a network scanner.

FIG. 4 illustrates greater functional detail of a scanner 112. The Platform Messaging Gateway Process 402 runs in Platform Messaging layer 301. It establishes the secure connection to NSOC 100 upon scanner device boot up. Messages arriving to the scanner 112 from NSOC 100 may be directed to the Scan Orchestrator process 403. For example, scan Launch messages 202 are delivered to this process. Scan Orchestrator 403 starts an independent Scanner Engine process 404. Although only one Scanner Engine process 404 is shown, in some embodiments multiple Scanner Engine processes 404 may be simultaneously run on a scanner 112. Scanner Engine process 404 is responsible for determining which tests programs 405 to run and launching those test programs by initiating one or more commands. When a test program launches, it establishes a local communication path 406 to Scanner Engine 404 for the purpose of sharing discovered information, such as in real time. For example, test program 405 may share discovered information with Scanner Engine 404 before test program 405 is finished executing. Although Scan Orchestrator 403, Scanner Engine 404, Platform Messaging Gateway Process 402 and test programs 405 are shown as separate functions in FIG. 4, they may each represent a portion of a program, or a subroutine, running on a single computer.

Test programs 405 send network packets to the targets (e.g., networked devices 113, 114, or 115) they are assessing and receive responses from the targets. These packets generally take the form of TCP/IP, ICMP and/or UDP datagrams. A given test program 405 may discover many independent findings. For example, a Portscan Test may discover many open ports on a given IP address for a given device. In this example, each open port is considered an independent finding within the context of the given host IP address that the Portscan Test discovers. As such, each individual set of information that is discovered from the network devices may be considered a context finding. As test program 405 is running, each context finding may be communicated to Scanner Engine 404 in real-time as the information is discovered. Scanner Engine 404 then may modify its behavior in response to the context findings as they arrive—the test need not finish before context findings are sent to the Scanner Engine 404. When a scan completes, Scanner Engine 404 packages the results into an output file that it stores on the Scanner Disk 401. Scanner Engine 404 then signals Platform Messaging Gateway Process 402 to send the results to NSOC 100 across the established secure channel (e.g., 107, 108, or 109) where the Scan Orchestrator and Message Gateway 104 receive them and call services upon Business Logic Complex 102 in order to insert those results into NSOC Database Complex 101.

Scanner Test and Engine Interaction

Figure 5:
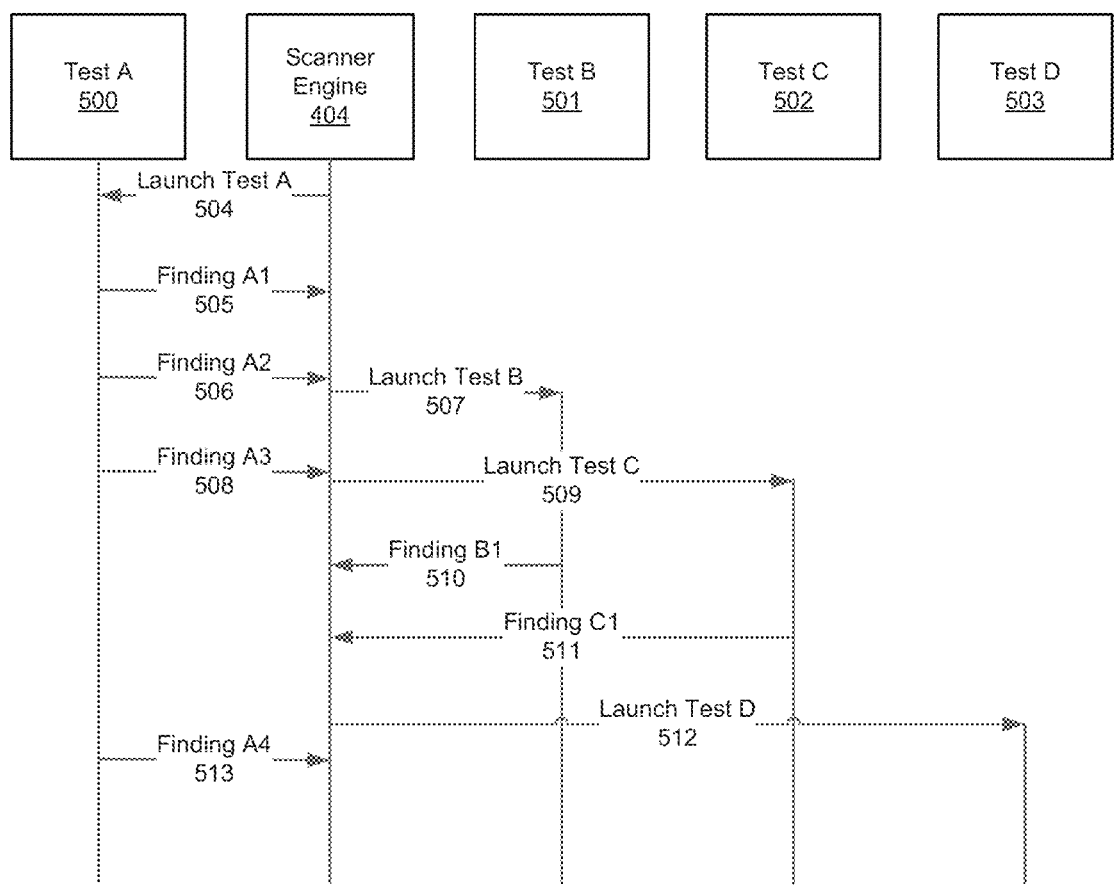
FIG. 5 is a process flow diagram showing the interaction between a scanner engine and a plurality of test programs.

FIG. 5 illustrates the interaction between Scanner Engine 404 and test programs 500, 501, 502 and 503. This figure illustrates that the test programs identify findings as they are running. For example, Scanner Engine 404 launches test program A 500 by sending the Launch Test A command 504. As test program A 500 executes and discovers context findings, test program A sends those context findings, such as Finding A1 505, to Scanner Engine 404. Upon each discovered context finding, the context finding is shared with Scanner Engine 404. In some embodiments, each context finding results in a message being sent to Scanner Engine 404. The Scanner Engine processes the context findings as they arrive and may determine a new test to launch at that given point in time. For example, Scanner Engine 404 may determine that it should launch test program B 501 and send a command 507 after having received Finding A2 506 from test program A 500. By launching a second test program based on information gathered from a first test program before the first test program has finished executing, the system may be able to decrease the time required to run a complete scan. As shown, test program A 500 continues to find and report context Finding A3 508 and Finding A4 513 after test program B 501 is launched. In addition, the system may be able to better tailor a scan by running test programs in response to information gathered from other test programs.

FIG. 5 also shows how additional test programs C 502 and D 503 may be launched by Scanner Engine 404 and how the test programs may be launched in response to context findings from one or more test programs. For example, Scanner Engine 404 launches test program C 502 after having received three findings (505, 506, and 508) from test program A 500. Also, Scanner Engine 404 launches test program D 503 by issuing command 512 after having received Findings A1 505, A2 506, A3 508, B1 510, and C1 511. Therefore, the decision to launch test program D may be based on context findings reported from test programs A 500, B 510, and/or C 502. The result may be a scan that adapts to the information gathered as it is gathered, thereby resulting in a faster and better tailored vulnerability scan.

Context Levels and Context Findings

In some embodiments of the scanner 112, the scanner 112 is capable of storing any type information that has been discovered. The information tracked by the scanner 112 may be classified as falling within five levels called contexts levels. In this embodiment, these contexts levels are: 1) Scan context, 2) Host context, 3) Service context, 4) Application context, and 5) Vulnerability context. The Scan context is the root level context in that it has no parent context. The other four contexts exist within their parent context level. The scan context of a particular context finding may be an identification of a particular scan. For example, the scan context of a context finding may identify the date and manner that a particular network is scanned.

The different context levels represent a hierarchical description of a particular context finding. The Host context exists within the Scan context. The Service context exists within the Host context. The Application context exists within the Service context, and the Vulnerability context exists within its parent Application context. The information contained within each context level is described in more detail below.

Each context level contains a uniqueness identifier that distinguishes a context finding at that context level from another context finding at the same level. However, there is only one possible context finding at the Scan context level and, as such, it has no uniqueness identifier. There are many possible context findings at the Host context level 600, and these may be distinguished from each other at that level by their IP address. For example, a host context finding for 192.168.60.2 is distinguished from 192.168.60.3 at the Host context level because of the different IP addresses. The Service level context 601 uniqueness may be made up of the port and the protocol (e.g. 80-TCP), for example. Each independent piece of information that the scan discovers is referred to as a context finding. A given context finding may be unique by the uniqueness of each of the context levels that applies to it. For example, a vulnerability finding is fully qualified by expressing the unique IDs for the Scan Context, the Host context, the Service Context, the Application context and the Vulnerability context. This context finding's fully qualified context may resemble the following string: "Host:192.168.60.2:Service:80:TCP:Application:HTTP: Vulnerability:5555". That context finding may be reported to the scanner engine 404 and be used in the scan as described above.

A test program may attempt to discover a single context finding or many context findings. For example, the Host Discovery Test attempts to discover all hosts within the IP ranges that it is given. As such, it attempts to discover many context findings—one for each IP within the requested scan ranges.

In some embodiments, all test programs used in the system are designed from the ground up so as to share their context findings with the Scanner Engine 404 over a local communication path as soon as a given context finding is discovered. To ease the implementation burden of sharing context findings with the Scanner Engine 404 as they are discovered, tests programs are implemented using a set of application programmer interfaces (API). Test implementers may use the API to "set" context findings. For example, in order to set a vulnerability context finding, an implementer may call a setVuln( ) API function call, and in doing so, pass in the appropriate context uniqueness and finding information. The API function, as called within the given test program, internally collects this information and shares the context finding in real time with Scanner Engine 404. The establishment of a local communication path to the scanner engine may be encompassed within the underlying functionality of the API.

Typically, test programs are designed to discover context findings at the same context level. However, embodiments of the present API may be flexible and allow one to set a context finding within any context level. A running test program may therefore set a context finding at one context level and, within the same test program instance run, set other context findings at a different context level. This concept is referred to as a cross-context finding. Cross-context findings are useful in identifying findings for many modern networks. One example where cross-context findings are useful is within virtualized host environments. For example, a test program may discover vulnerability-related context findings while it is testing within a context for a given host, service, and application. During that same test program, it may discover data for a different virtualized host (with a different IP address than the original context). In this situation, the test program may set context findings within the context of the virtualized host even though it had not sent any packets to that host. Cross-context findings allow the scanner to discover findings for a given context (e.g., host) that would not otherwise be possible and therefore provides a greater level of discovery for security-related issues.

Test programs may be designed in any programming language, such as C++ or Perl. In general, test programs send packets to the devices that they are auditing, receive responses, draw conclusions based on the responses, and share context findings with Scanner Engine 404 while the test program is still running. This event discovery "streaming" method results in a fast scan completion. It also provides the ability to draw conclusions on context findings that it is not auditing. For example, the system may set context information for a device that it is not currently testing from a context finding it has discovered from a related device.

A given test program need not always launch because the context information that it attempts to discover may never exist due to the landscape of what has been previously discovered for a given scan. For example, many vulnerabilities are only applicable to Windows operating systems. It therefore would be inefficient to attempt to test for Windows-unique vulnerabilities if the given host's operating system has been identified as Linux by a previously-executed test program. These dependencies are specified within the test program's program code using a test program API. Each new scanner release comes with a test-dependency file that specifies the context-dependent information that each test program depends upon. In some embodiments, during a new scan release, a tool may be executed versus the entire suite of test programs (or at least some of them), and it extracts the dependency specification for each test program against which it was executed and places the information into a meta-test release file. This file is then distributed to all scanners as part of a scanner release update over the secure channel between the scanners and NSOC 100, as described above in relation to FIG. 2. It is then used by the Scanner Engine 404 process during a scan run in its determination of what test programs to launch in response to information that has been received.

Scanner Database Schema

Figure 6:
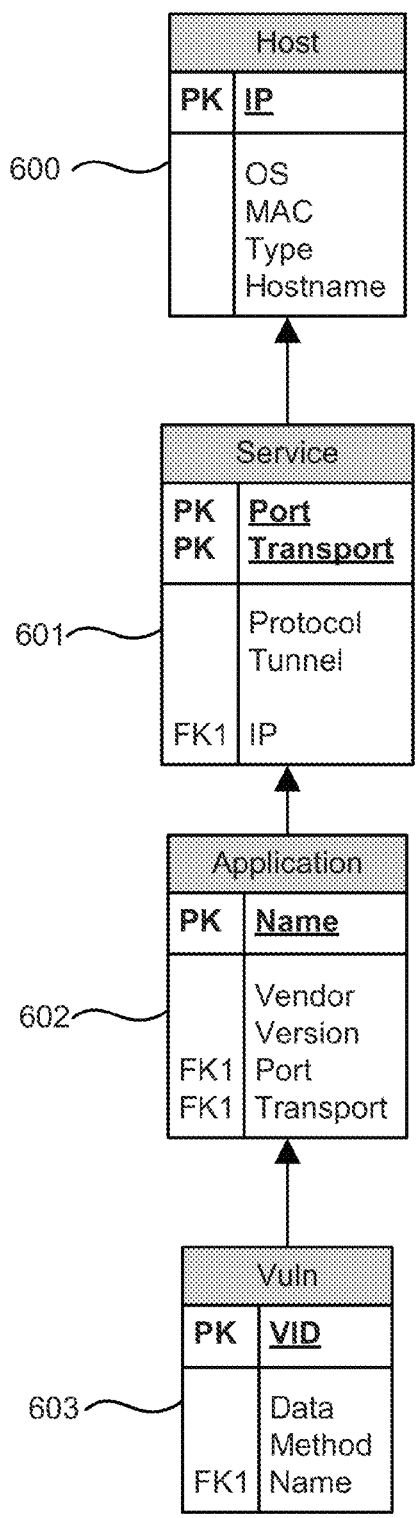
FIG. 6 is an entity-relationship diagram of a context finding.

FIG. 6 is an entity relationship diagram that illustrates the scanner relational database schema. The database schema includes information for all context levels with the exception of the Scan context because, in some embodiments, that context does not include any information that is relevant to a particular device and is only used while the scan is running. The database schema includes four tables that map directly to the other four context levels. First is the Host table 600 that relates to the Host context and that stores host-related information such as IP address, Operating System and other host-related information. Second is the Service table 601 that relates to the Service context and that stores service-related information such as the discovered open ports for a given host. Third is the Application table 602 that relates to the Application context and that stores application related information such as the application name and vendor name. Fourth is the Vuln (vulnerability) table 603 that relates to the Vulnerability context and that stores vulnerability-related information.

In some embodiments, the SQLite database management system is used to store the data tables in memory within Scanner Engine 404. In some embodiments, any relational database management system (RDBMS) product may be used and the data may be stored on scanner device hardware, such as a hard drive.

As a scan runs, Scanner Engine 404 receives context findings from the various running test programs. It stores the context findings in various data structures as well as within the four described data tables. When the scan completes, Scanner Engine 404 reads data that is stored within these four data tables and serializes the data into an output file. In some embodiments, the scan output file consists of an XML data structure on a disk. Once the file has been serialized, Scanner Engine 404 signals Platform Messaging Gateway 402 to send the results to NSOC 100.

Scanner Data Structures

FIGS. 7A-7J illustrate the various internal data structures that may be used by Scanner Engine 404. The Test Ready Queue 700 shown in FIG. 7A tracks the test programs that are ready to launch (e.g., T3) and upon which context findings (e.g., C1) to launch. Scanner Engine 404 determines the test programs that are ready to execute based on previously discovered context findings, as described above. The Test Run List 701 shown in FIG. 7B tracks the test programs that are currently running. It is a data structure that includes a number of entries that may be predetermined by the scan speed setting. The scan speed may be specified at scan launch time as a parameter to Scan Orchestrator 403 for the given scan. Faster scan speed settings correlate to a greater number of entries in Test Run List 701 and as a result, more simultaneous running test programs.

The Test Context Launch Table 702, shown in FIG. 7C, tracks the test programs that have already been executed for given context findings. For example, a Web Server Application Discovery Test tests to determine the application name for a previously-discovered web server and it should execute for each web server that is discovered. These dependencies are described within the test program itself and also within the meta-test release file on the scanner disk. For example, the test program should run for each independent applicable Service discovery context for services where the discovered protocol is HTTP for each device in the scan. If there are five hosts, four of which have one web server running on them but the fifth has two web server instances, there are then six total applicable unique fully qualified contexts applicable. Test Context Launch Table 702 in this case would have six tracking entries for the given test program once the test program has executed six times (once per unique context).

Scanner Engine 404 maintains two tables that track the test program to discovery context event dependencies. These are the Event to Test Dependency Table 703 shown in FIG. 7D and the Test to Event Dependency Table 704 shown in FIG. 7E. Although the data structures and their purposes differ, the information tracked within these data structures is the same. When Scanner Engine 404 receives a new context finding from a running test program, it consults Event to Test Dependency Table 703 to determine all test programs that are candidates for launching. It then consults Test to Event Dependency Table 704 for each launch candidate test program to determine if the test program has met all of its required launch dependencies. If it has, and if the test program has not yet launched for the given context as indicated from the information within Test Context Launch Table 702 for the given test program, Scanner Engine 404 launches the test program. When the test program is launched, an entry is added to Test Run List 701 for the given test program. The received context finding is also added to the appropriate Context Level Event Completion Table 705, 706, 707, 708 or 709.

Scanner Engine 404 also keeps track of events that have been received and processed for each context finding. If it has already received an event for a given context finding, it realizes that it has already processed the event and it takes no action other than discarding the event. There is one internal data structure for each of the five context levels, as illustrated in FIGS. 7F-7J. First is the Scan Context Level Event Completion Table 705 shown in FIG. 7F. This table holds information from scan context level events. Second is the Host Context Level Event Completion Table 706 shown in FIG. 7G. This table holds the information gathered on the Host context level. Third is the Service Context Level Event Completion Table 707 shown in FIG. 7H. This table holds the information gathered from the Service context level. Fourth is the Application Context Level Event Completion Table 708 shown in FIG. 7I. It holds information gathered from the Application Context level. The Vulnerability Context Level Event Completion Table 709 shown in FIG. 7J holds information gathered from the Vulnerability Context level. When an event for a context finding is received, and if it has not already been received, Scanner Engine 404 inserts the received event within the appropriate Context Level Event Completion Table 705, 706, 707, 708 or 709.

Life of a Scan

Figure 8:
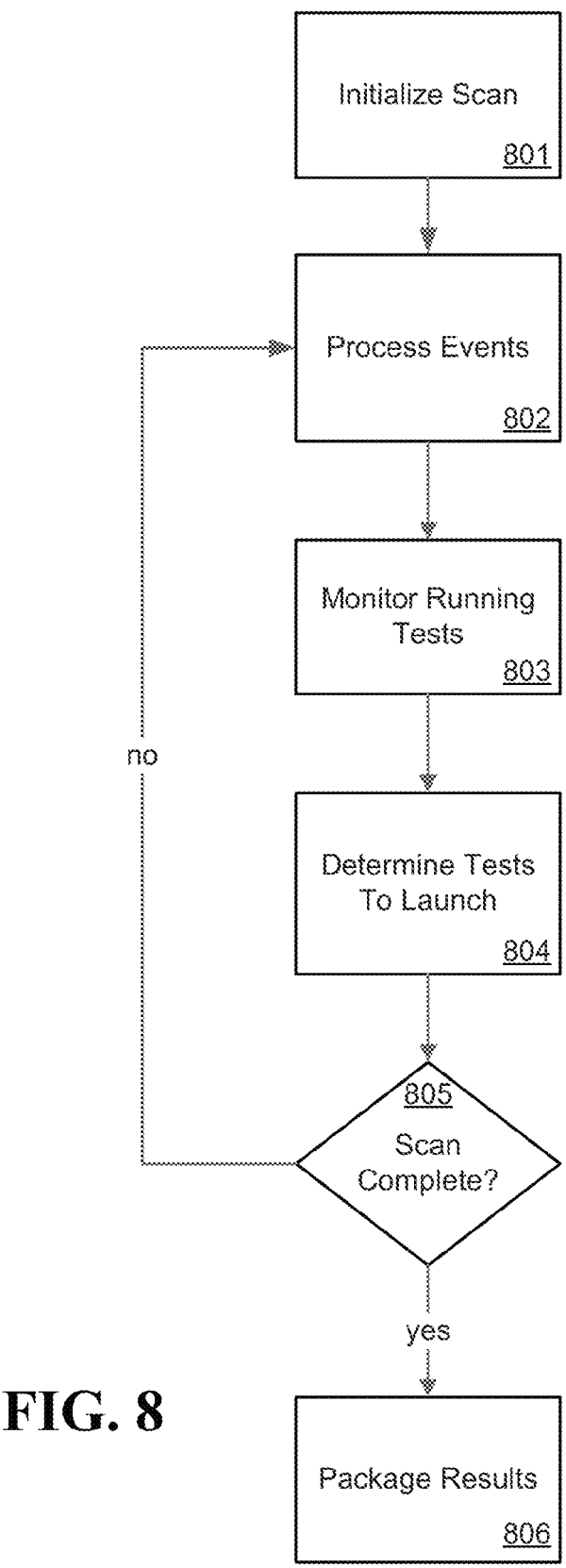
FIG. 8 is a flow chart of a scanner engine process.

FIG. 8 shows the high level flow of a scan. When the Scan Orchestrator 403 process launches a scan, it creates a Scanner Engine 404 process. This is responsible for all stages of the scan's life, including initialization 801 (FIG. 9), processing events as they arrive 802 (FIG. 10), monitoring the running tests 803 (FIG. 11A), determining when tests are ready to launch 804 (FIG. 11B), determining if the scan has completed 805, and packaging the results after the scan has completed 806 (FIG. 11C). These activities are described further with reference to FIGS. 9-11C.

Figure 9:
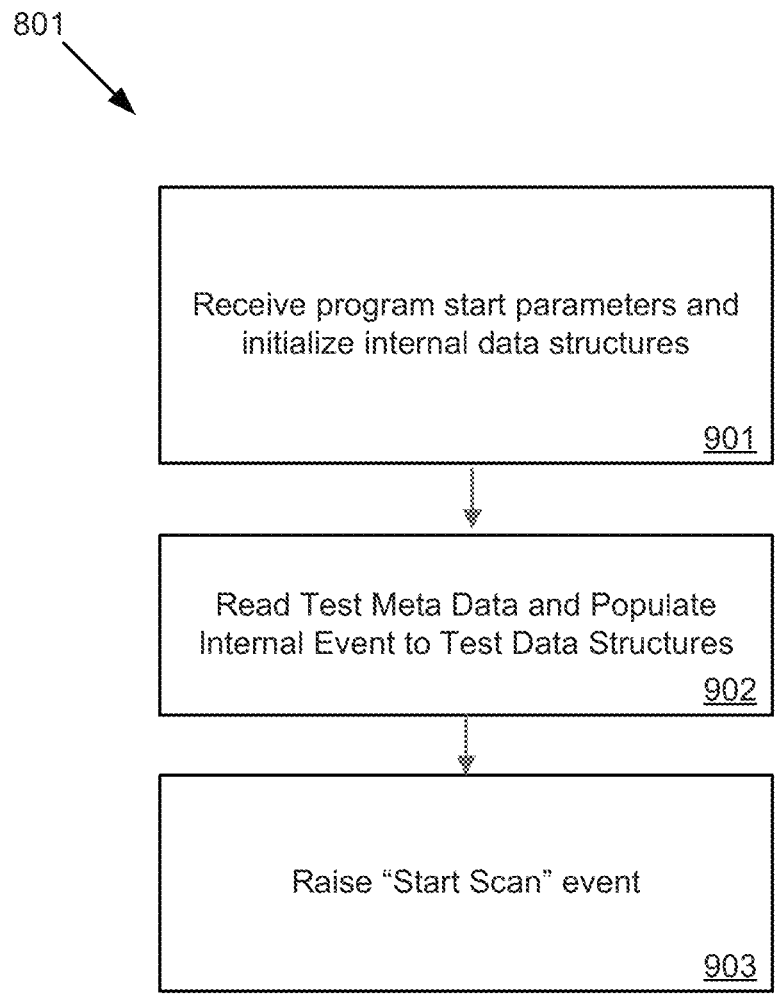
FIG. 9 is a flow chart of a scanner engine initialization.

FIG. 9 illustrates the Scanner Engine 404 initialization. In some embodiments, Scanner Engine 404 is a program that may be invoked from another program or via a command line interface. In both cases, Scanner Engine 404 receives program start parameters and initializes data structures 901. Program start parameters may include, for example, scan speed and IP address ranges. Scanner Engine 404 may use the scan speed parameter to determine the number of simultaneous running tests that it may launch, and it may initialize the Test Run List 701 accordingly. The IP ranges that are passed in as an argument are stored in the Scan context as a key-value pair. They are used by Scanner Engine 404 at the point where the Host Discovery Test is launched, for example.

Test Ready Queue 700 is initialized to a given size but may grow during a scan if needed. Test Context Launch Table 703 is initialized as empty and contains no entries for any test programs at initialization. If may grow as new test programs are launched for the first time for the first context that it tests.

Two additional pieces of information are passed as parameters to Scanner Engine 404 on program start. These are "ordering instructions" for various test programs, and "client context findings information." The ordering instructions are used to run given test programs in a particular order. The goal may be to discover particular context findings as fast as possible. For example, some internet ports, such as port 80 and port 21, may be found much more frequently than other ports, such as ports 1000 and 1001. If a test program can discover a context finding at an earlier time with particular ordering instructions than without them, it could result in an overall faster scan execution. This result may be compounded when additional test programs are run based on context findings from other test programs. For example, if a second test program is launched when port 80 is found, the second program will be launched sooner if port 80 is tested before any other port, resulting in a faster overall scan.

Ordering instructions may come in two forms—default ordering instructions and client-specific ordering instructions. Default ordering instruction may be implemented within the given applicable test program or may be sent to the Scanner Engine 404 as a parameter. For example, in some embodiments, the Port Scan Test scans more prevalent ports up front by default, as may be specified within its program code. However, Scanner Engine 404 may receive client-specific ordering instructions as an argument to Scanner Engine 404 on process startup. This allows for the information discovered during a given client's previous assessment to be used to achieve faster scan completion times.

Client context finding information may include context information that is specific to a particular client. For example, information from previous scans for a given client may be sent from NSOC 100 to the scanner 112 for the given client under assessment. This past information is used by Scanner Engine 404 to attempt to discover context findings that it might otherwise miss. For example, a previous assessment may have discovered a vulnerable administration account on a given web server. This same account information may be applicable on other hosts in the current scan even though context finding information might cause the given test program to not attempt that given account with the given credentials. In this way, Scanner Engine 404 can use previously discovered information from past scans for the same client in its attempt to identify context findings.

As part of the initialization, Scanner Engine 404 reads 902 the meta-Test release file data and populates Event to Test Dependency Table 703 and Test to Event Dependency Table 704. This information tracks the given context finding information that specifies whether or not a given test program should launch.

At the end of its initialization, Scanner Engine 404 raises a Scan context level finding by creating an entry in the RDBMS Scan table with a "Start-Scan" context finding event 903 and processes it, immediately in some embodiments. This causes the scan to start because there is always a dependency entry in the Event to Test Dependency Table 703 for this event. The test program typically associated with this event is the Host Discovery Test. Scanner Engine 404 then launches that test program and passes it the previously-stored IP address ranges. Scanner Engine 404 then adds an entry to Test Run List 701 for the given Host Discovery Test. It then enters a processing loop labeled as Process Events 802 described in connection with FIG. 10.

Figure 10:
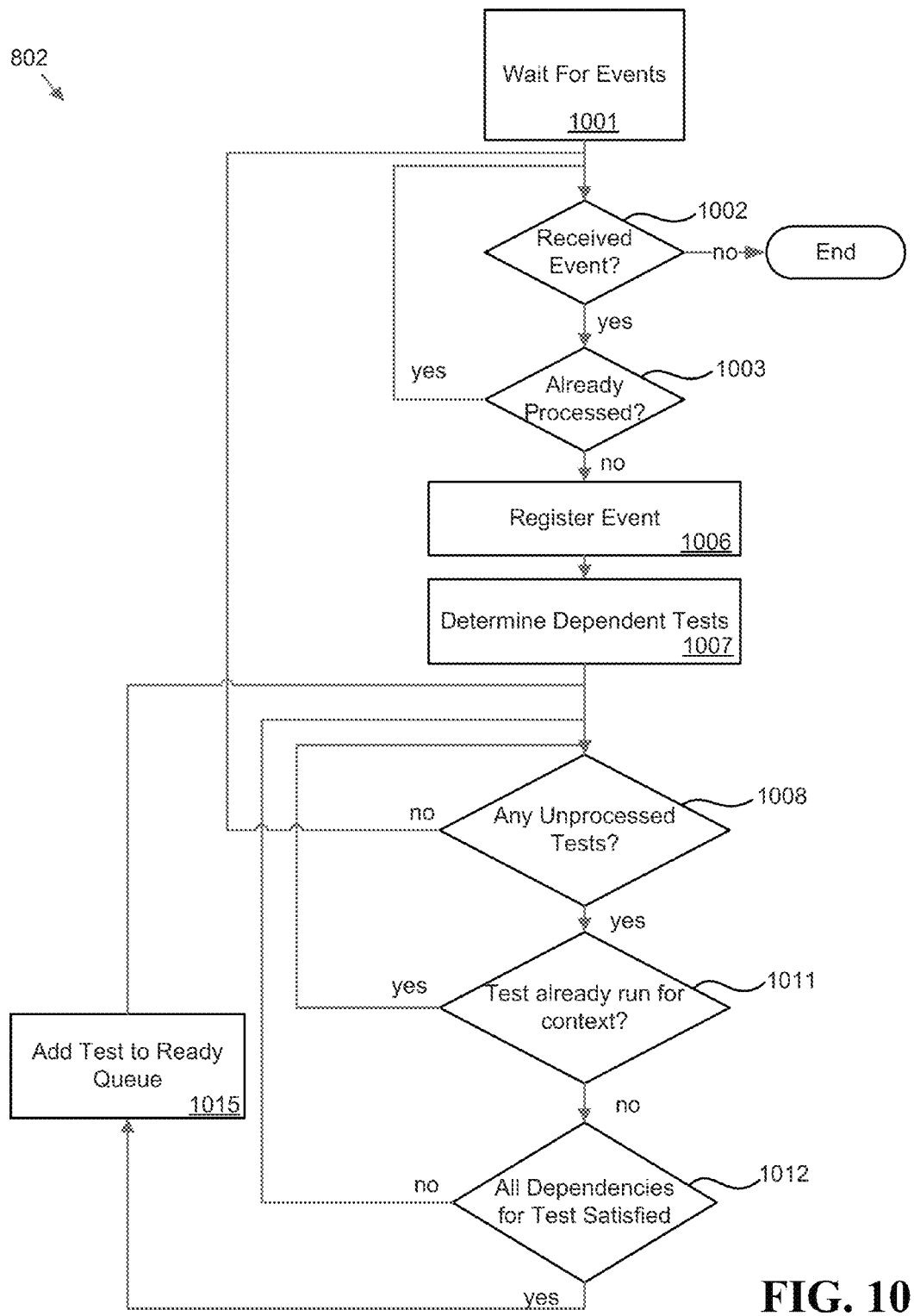
FIG. 10 is a flow chart of a scanner engine process.

FIG. 10 illustrates the activities that Scanner Engine 404 performs upon receiving an event. Once initialization is complete, Scanner Engine 404 enters a state in which it waits for an event 1001. Sometimes, all test programs are busy for an extended period of time. Scanner Engine 404 may be programmed to send a wakeup event (e.g., a short timer) to itself in the event of a malfunction in order for Scanner Engine 404 to maintain control of the process in the event where a malfunction would cause no events to occur. If no event is received, Scanner Engine 404 re-enters its idle waiting state to process events 802. When an event is received 1002 from a test program or when the Scanner Engine 404 timer event is received, Scanner Engine 404 wakes up and processes the event. It first determines if it had already processed the event for the given context finding 1003. It does so by consulting one of the Context Level Event Completion Tables 705, 706, 707, 708 or 709 for the given context finding. If it had already processed the event for the given context, it moves on to reading its event queue 1002 to determine if any new events were received. If it has not previously processed the event for the given context finding, then Scanner Engine 404 registers the event 1006 in the appropriate Context Level Event Completion Table and stores the context finding in the appropriate RDBMS table for the given context level 600, 601, 602 or 603.

The Scanner Engine 404 next determines the test programs that are dependent upon the received event 1007. It does so by consulting Event to Test Dependency Table 703 for the given context finding received in the event. Scanner Engine 404 then examines each test program identified in a loop. FIG. 10 shows the loop control at the beginning of the loop in the "Any Unprocessed Test" control element 1008. If there are no more unprocessed test programs, the loop is completed and control passes along the "no" path back to reading its event queue 1002. For each unprocessed test program, control passes along the "yes" path. Scanner Engine 404 then determines if it has already launched the given test program 1011 for the current loop pass for the given context finding. If it has, there is no reason to launch it again because it would only discover information that had already been discovered. In this case, the "yes" path is taken and control returns to 1008 to examine the next test program. If Scanner Engine 404 has not already launched the given test program, Scanner Engine 404 then determines if all dependencies for the given test program have been satisfied. This is shown in FIG. 10 within the control statement "All Dependencies for Test Satisfied" 1012. It does so by consulting Test to Event Dependency Table 704. If the test program cannot launch because not all of its dependencies were satisfied, control passes along the "no" path back to 1008 to examine the next test program. If all dependencies were met, control passes along the "yes" path and, in this case, Scanner Engine 404 begins the process of launching the test program by adding it to Test Ready Queue 700 as seen in process step 1015. Once the test program has been added to the Test Ready Queue, control returns back to examining the next Test 1008 identified as dependent upon the received event.

Figure 11A:
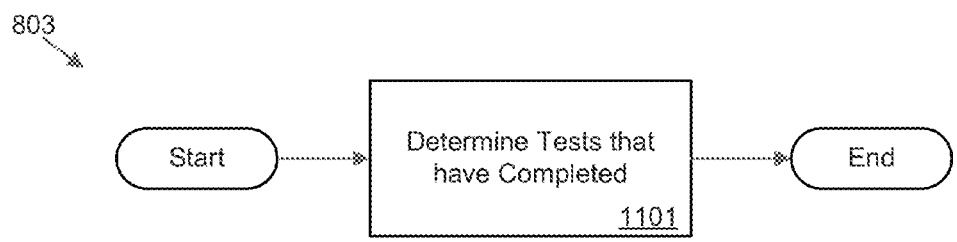
FIGS. 11A-11C are flow charts of a scanner engine process.

FIG. 11A illustrates the Scanner Engine 404 activities for monitoring currently-running test programs. After having processed received events, there may be test programs in the Test Ready Queue that are ready to launch. At any point in time, test programs might be running and might have completed. Scanner Engine 404 must therefore remove any completed test programs from the Test Run List in order to make room to launch test programs that are ready. It does this by determining test programs that have completed 1101. To do so within some embodiments, the Scanner Engine 404 tracks the process IDs for the running test programs within the Test Run List. It then sends signals to the operating system for each process to determine whether they are still running. For any that have completed, their entries are removed from the Test Run List.

Figure 11B:
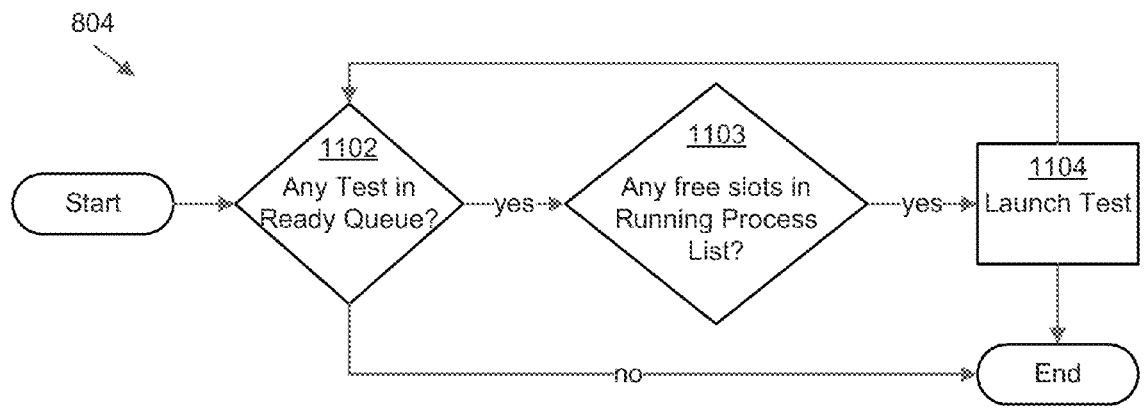
Figure 11C:
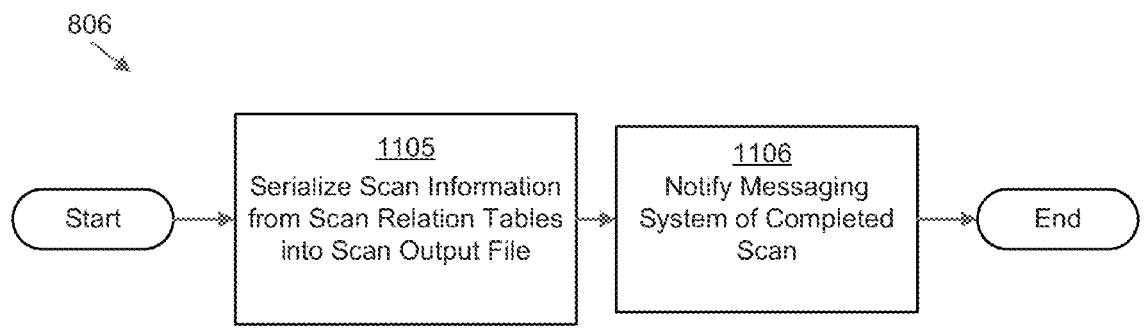

FIG. 11B illustrates the Scanner Engine 404 activities for determining if any test programs can be launched and, if so, launching them. Scanner Engine 404 determines if it can launch test programs by first examining Test Ready Queue 700 to see if there are any test programs that are ready to launch 1102. If there are, it then determines 1103 if there are any free slots within the Test Run List. If there are, Scanner Engine 404 removes the Test Entry from Test Ready Queue 700 and adds an entry to Test Run List 701. It then launches 1104 the given test program. It also adds an entry to Test Context Launch Table 702 for the given test program for the given context finding. If there is no test program in the Test Ready Queue or there are no free slots in the Test Run List, then Scanner Engine 404 determines if the scan has completed 805. It does so by consulting Test Ready Queue 700 and Test Run List 701, and by reading the local communication channels 406 associated with possible running test programs to determine if there are any available events. If there is nothing in the Test Ready Queue and no test program presently running (Test Run List empty) and no pending events, Scanner Engine 404 deems the scan to have completed and control passes to packaging the results 806 (FIG. 11C). If the scan is not deemed complete, control passes back to the point where Scanner Engine 404 is idle and waiting for events 802.

FIG. 11C illustrates the Scanner Engine 404 activities for packaging a completed scan. Once the Scan completes, the Scanner Engine 404 reads all results from the scanner RDBMS tables and serializes the results into an output file on disk 1105. In a preferred embodiment, the results are stored in an XML format. Scanner Engine 404 then signals the Platform Messaging Gateway to send the results to the NSOC 1106.

Scan Stored in NSOC Database

In some embodiments, when the Platform Messaging Gateway receives notification that the scan results are ready, it sends these results to the Scanner Orchestrator 104. The Scan Orchestrator then parses the XML results representing the scan results, and calls a service on the Business Logic Complex 102 in order to insert the scan results into the Database Complex 101.

Discovered Host to Asset Database Schema

Figure 12:
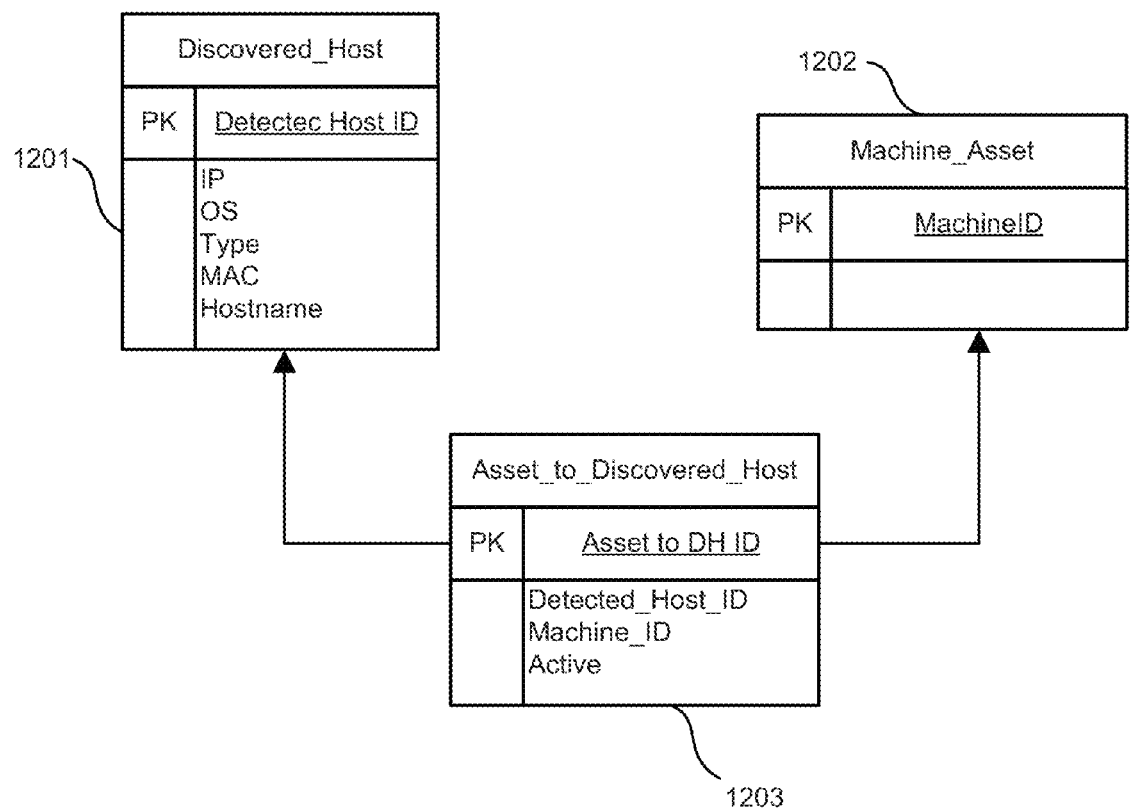
FIG. 12 is an entity-relationship diagram of tracked network assets to hosts within a given point-in-time vulnerability assessment.

FIG. 12 illustrates an entity relationship diagram of the relationship between a discovered host and a network asset, referred to in FIG. 12 as a Machine Asset. In some embodiments, these tables are implemented in the NSOC Database 101. The discovered host 1201 represents the information that was discovered by way of scanner(s) 105 and represents the same information as stored in the Scanner RDBMS Host table 600. This information represents the discovered host at a given point-in-time assessment along with its associated characteristics. Machine_Assets table 1202 represents the network assets that are tracked by the vulnerability management system. Each network asset within the Machine_Asset table 1202 is associated to at least one scanned host within the Discovered_Host table 1201. Each network asset may be associated to many discovered hosts representing a discovered host within a given vulnerability assessment at a point in time. In some embodiments, the mapping of a network asset to its one or many discovered hosts is stored in a separate database table Asset_To_Discovered_Host 1203. The Asset_To_Discovered_Host table 1203 is configured to allow the system to determine which scans a given network asset appeared across time, permitting determination of the existence of present vulnerabilities for a given network asset at any given point in time. In some embodiments, at least one of the entries within the Asset_To_Discovered_Host table 1203 for a given Machine_Asset, must have the Active column set to True. This column may serve as an indicator that the given row which has Active set to True is the most recent scanned host which maps to a given Machine_Asset.

In some embodiments, when the scan results are inserted into the database 101, the Scanner Host 600 information is inserted into a new entry within the NSOC 100 Database as part of the Discovered_Host 1201 table. In some embodiments, Service, Application and Vulnerability information associated to a given discovered host as seen in FIG. 6 may also be stored in the NSOC Database 101.

Network Host Reconciliation

Figure 13:
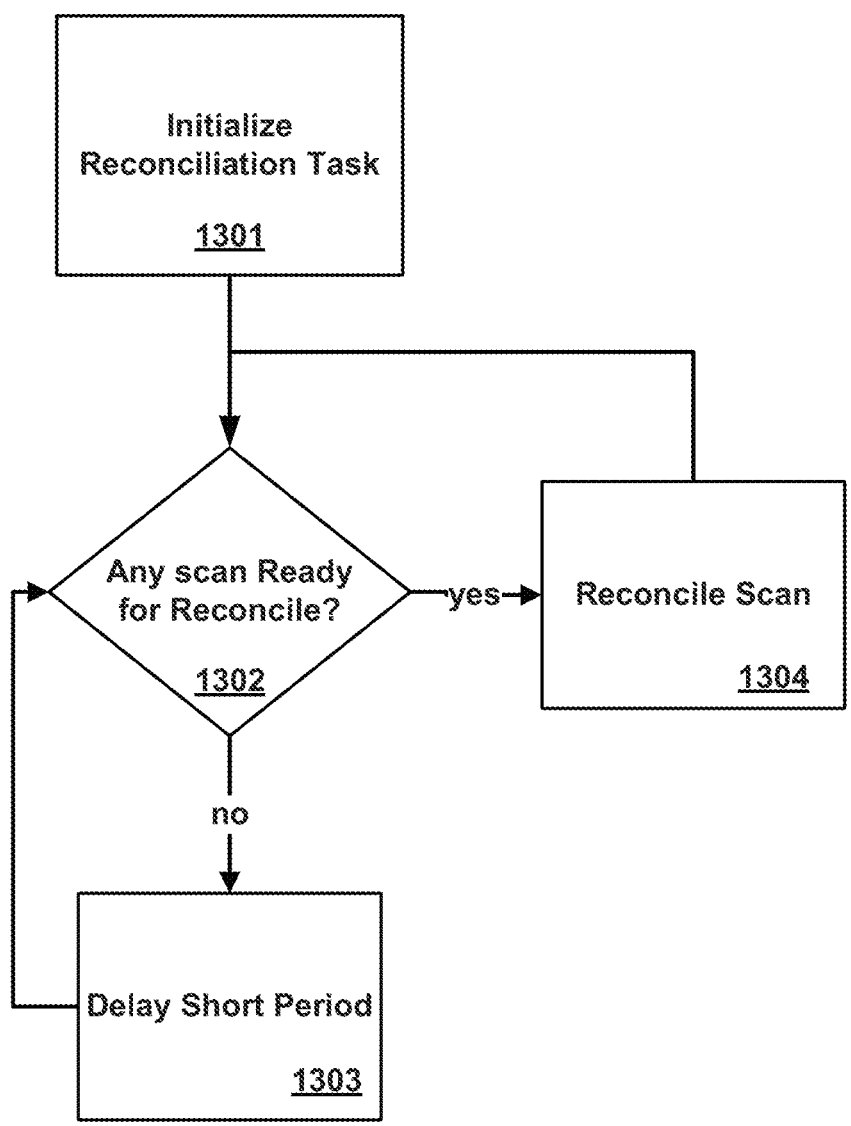
FIG. 13 is a flow chart of the reconciliation task high level activities.
Figure 14:
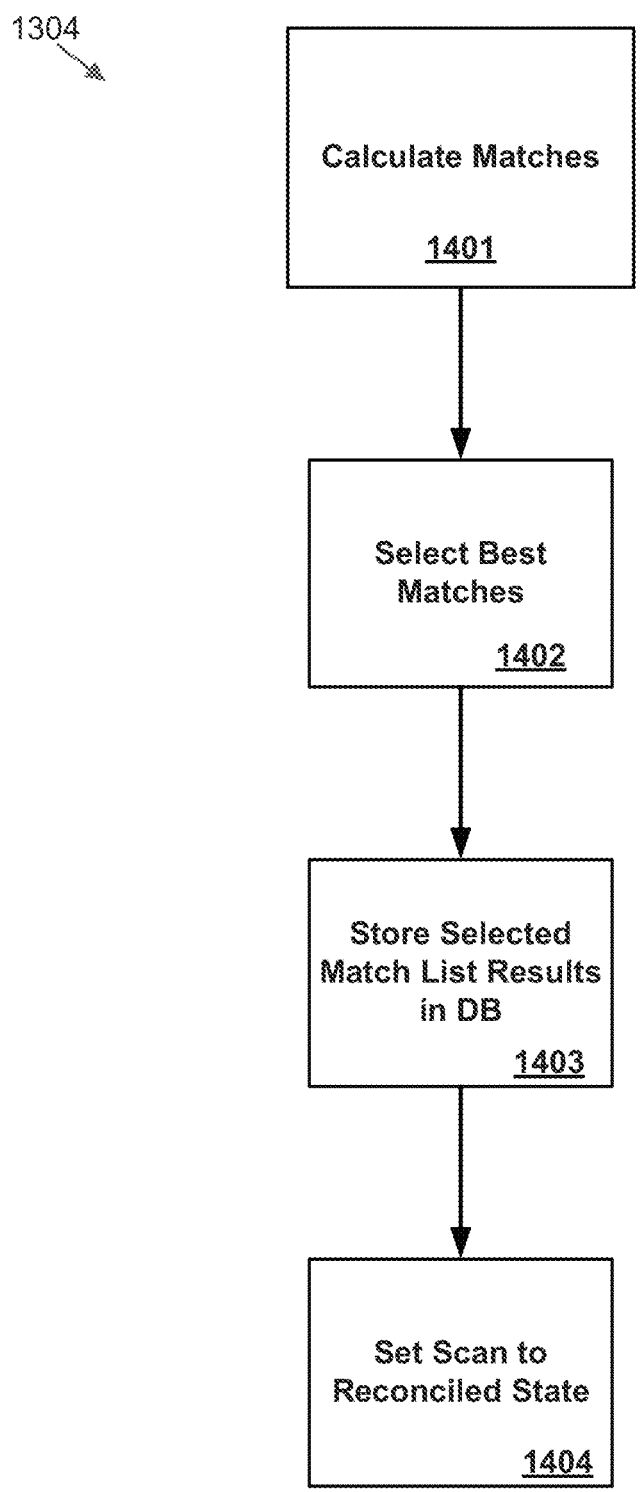
FIG. 14 is a high level flow chart of the reconciliation algorithm.

In some embodiments, a process may reconcile entries within the Discovered_Host table 1201 to appropriate entries in Machine_Asset table 1202 for scans that have not yet been reconciled. The process begins with the initialization of the reconciliation task 1301. They system then determines whether any scan is ready for reconciliation 1302, and if so, proceeds to reconcile that scan. If not, the system delays for a short period 1303 and then checks again whether there is a scan that is ready to be reconciled. In some embodiments the Business Logic Complex 102 comprises and/or continuously runs the reconciliation process. One embodiment of the reconciliation task is illustrated in the flow chart of FIG. 13. The task implements Reconcile Scan 1304 which may in some embodiments be referred to as the "Network Host Reconciliation Algorithm." Referring now to FIG. 14, the Network Host Reconciliation Algorithm determines an optimal matching of the discovered hosts (discoverable entities) within the scan being reconciled, also referred to as assessment hosts, to the network assets or network hosts (uniquely identifiable assets) tracked by the system and which may be a result of previously matched scanned hosts from a past scan, a past reconciled scan, two past scans, two past reconciled scans, three, four, five to ten, or from many past scans, or past reconciled scans. Network assets may also be imported from third party scanners, other or third party databases, asset tracking software, spreadsheets, paper records, data structures, or other sources.

Hosts, and/or network assets need not necessarily be individual computing devices, but may include, without limitation, networked devices, software instantiations, instantiations of operating systems, virtual servers, or any other identifiable network asset, handheld devices, portable devices, and the like.

In some embodiments this task calculates matches 1401 for each assessment discovered host as compared to each network asset. It then selects the most optimal pair matches 1402, stores the resulting matches 1403 in the NSOC Database 101 and sets the scan to a reconciled state 1404.

In performing the above, the reconcile task compares characteristics of each network asset for a given organization's network, versus the discovered characteristics of each discoverable entity within a network vulnerability assessment that was conducted against the same organization by way of a network scanner. Characteristics or identification of discoverable entities may also be obtained and/or imported from other sources or by other means. For example, but without limitation, information pertaining to discoverable entities may be obtained by way of third party asset management software, third party assessment tools, scanners, reporting software running on discoverable entities, and the like.

Figure 15:
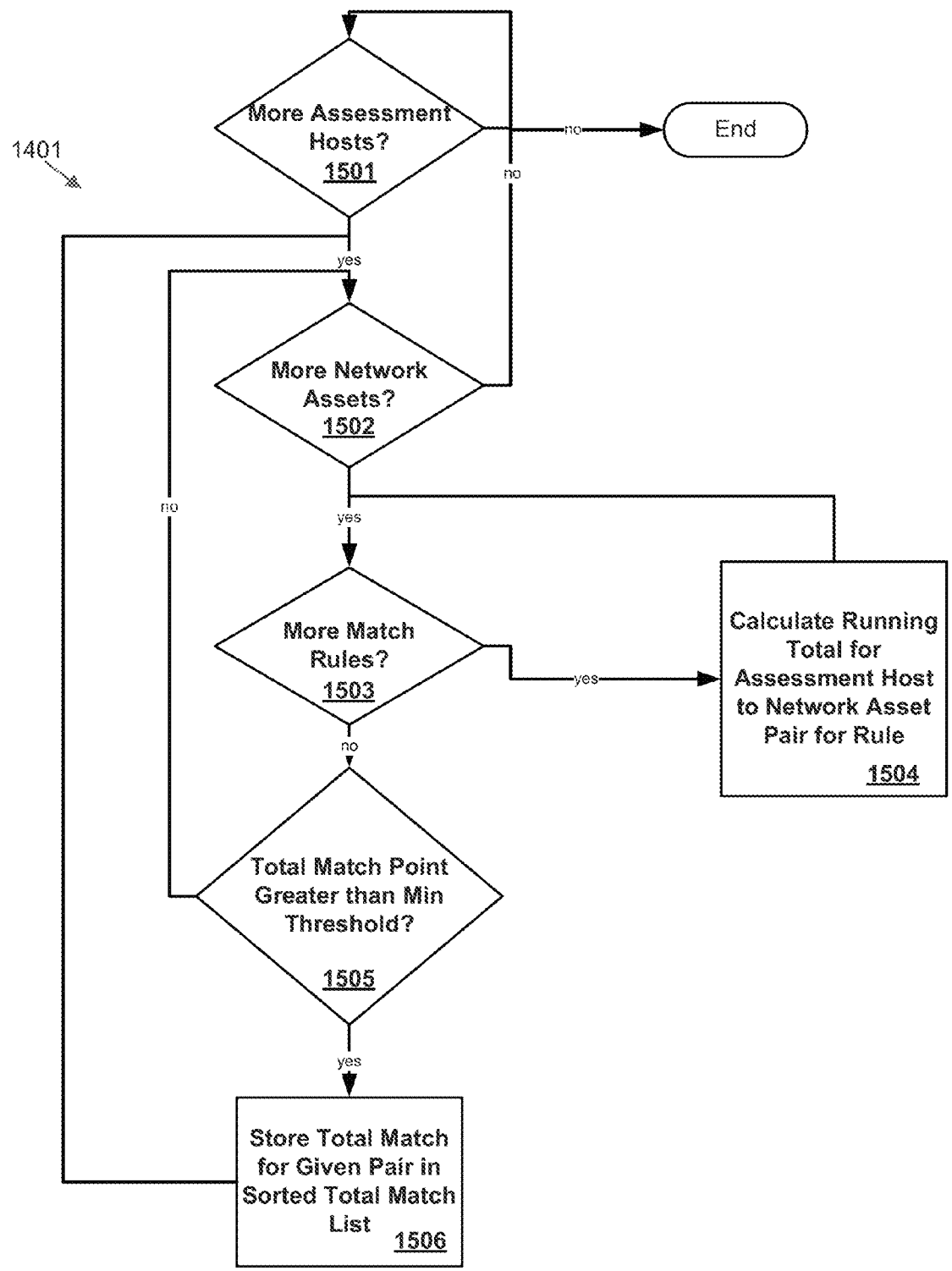
FIG. 15 is a detailed flow chart representing a matching algorithm.

The match pair score values may be stored in a sorted list in memory. An embodiment of a portion of this process is illustrated in the flow chart in FIG. 15.

In certain embodiments, the process first determines whether additional hosts exist 1501 if so, and if there remain network assets to be reconciled 1502, the process uses a multitude of matching rules and host attributes to calculate running totals, or scores pertaining to a pairing of Assessment Host to Network Asset 1503, 1504. If the running total, or score pertaining to the pairing exceeds a preset, or dynamically calculated threshold 1505 then the total, or score for the paring is stored in a sorted total match list. 1506.

Figure 16:
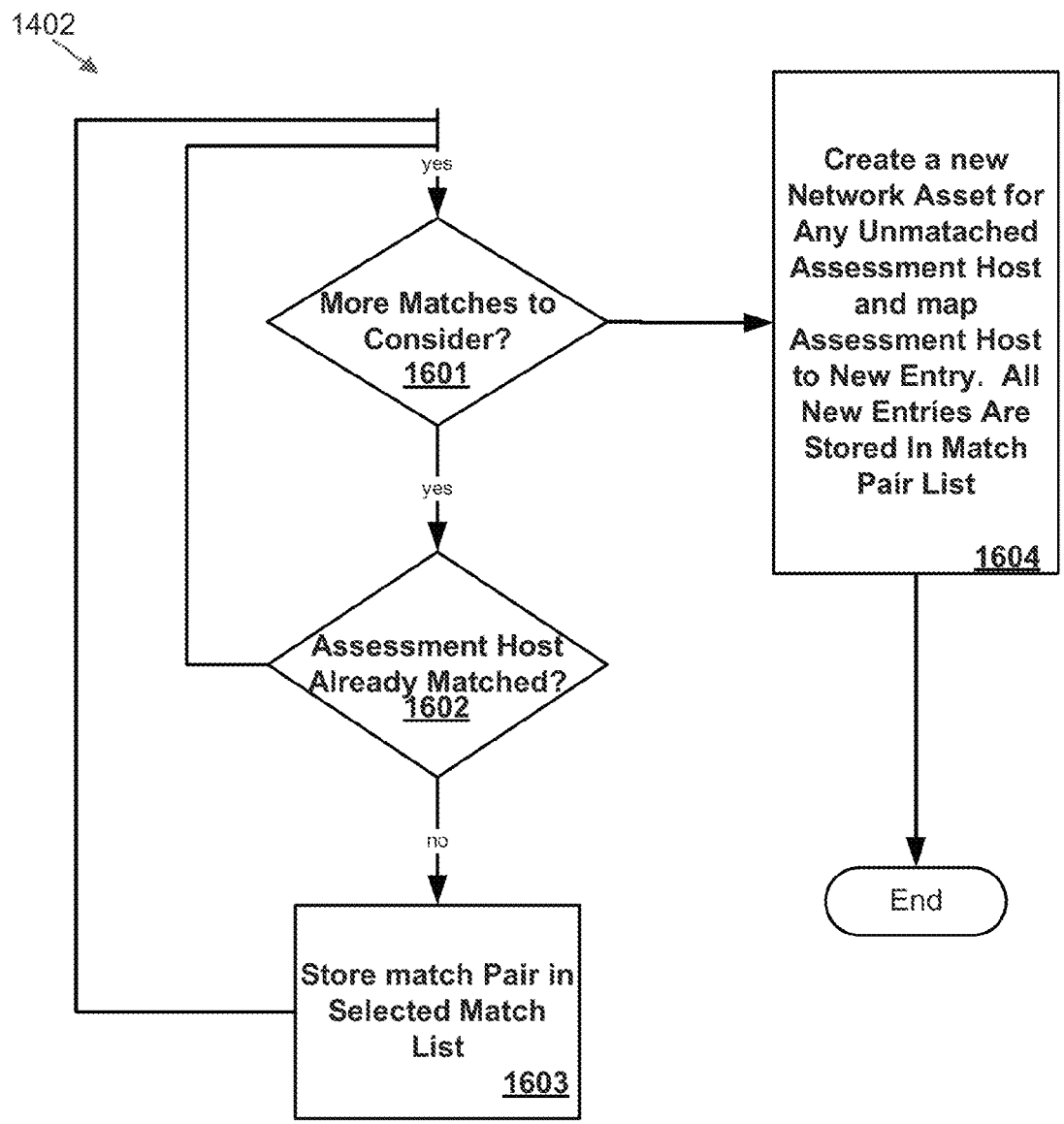
FIG. 16 is a detailed flow chart of a best match selection process used by the reconciliation algorithm.

The task's purpose in performing the comparisons described above is to produce an accurate and optimal matching of assessment discovered hosts to network assets. Once all combinations of assessment hosts to network asset comparisons are completed and these have been stored in a sorted list, or other data structure, the reconciliation task then selects the best matches. The process for selecting the best, or most likely accurate matches is illustrated in FIG. 16. In some embodiments the selection process may use a "greedy" algorithm by cycling through the sorted match list and selecting the top matches first. The selections are stored in a Selected Match List 1603. In certain embodiments, an optimal matching is one where an assessment host may map to 0 or 1 network assets, and where a network asset may at most be matched to only one host within the assessment being reconciled. Any non-matched assessment host results in the creation of a new network asset 1604. Once an optimal and/or accurate matching is complete, the reconciliation task stores the resulting accurate and optimal matching information within the database tables 1403.

Network device characteristics that may be used to compare network assets to network host discovered as part of a given network assessment, include but are not limited to characteristics such as: IP address, IP address of parent router, Hostname detected by the scanner using various techniques including NetBIOS, DNS or other, Domain Name, MAC address, Operating System, Host Type such as Server, Client, Firewall, Printer, Switch, Hub or other, List of open TCP and UDP ports, List of services running on the host, List of Vulnerabilities detected on the host, Windows SID, Host Serial Number, and other detectable characteristics or characteristics that may become detectable.

In certain embodiments, matching rules used to match network assets to assessment identified hosts may include one or more device characteristics, a rule condition related to comparing a given network asset's characteristic(s) for the rule versus a given assessment host's characteristic(s) for the same rule, as well as s a numeric point value if the rule is satisfied where the point value may be positive or negative. The rule condition may have values of 'match' representing the case where the rule characteristic(s) of the network asset match those of the assessment host, 'loss' representing the case where the network asset has the characteristic(s) for the given rule but where the assessment host does not, or 'gain' representing the case where the network asset does not have the characteristic(s) for the given rule but where the assessment host has the characteristic(s) for the given rule. In some embodiments, the match rules are stored in the NSOC Database 101 and read into computer memory by the reconciliation tasks. One example of a hypothetical matching rule is a rule which takes into account the characteristics of IP address and NetBios Hostname, condition of 'match' and point value of 100. Another related example is one which includes characteristics of NetBIOS Hostname, condition of 'loss' and point value of −20. Numerous additional combinations of characteristics, conditions and point values are possible and are contemplated within the scope of the present invention.

In some embodiments, multiple rules may be used to match network assets to assessment hosts. For example, two or more rules, five or more rules, up to 100 rules, or many more rules may be used to match network assets to assessment hosts (identifiable hosts). In some embodiments, the number of rules used may be determined dynamically or algorithmically depending on certain criteria, including, without limitation, characteristics of the network, available computing power, network history, identifiable asset turnover, prior asset characteristic changes, operating system types or the like. Those having ordinary skill in the art will appreciate many combinations and numbers of rules appropriate under different circumstances and these variations are contemplated within the scope of the present invention.

In some embodiments, the reconciliation algorithm totals the applicable match rules that involve each network asset to assessment identified asset/host pair in order to obtain a resulting total matching point count for a given assessment host to network asset pair. The task calculates the total matching point count for all network asset to assessment host pair within computer memory. For example, if a given organization's current network asset information includes 1000 network assets and where the current assessment being reconciled includes 50 assessment hosts, the system may store match point values for the 50000 pairs. In some embodiments, the task running within the Business Logic Complex stores these pairs in sorted fashion from high to low point value.

In some embodiments, the reconciliation matching algorithm may comprise an additional rule which requires a minimum value that a total match point value must have for a given assessment host to network asset pair in order to be deemed a good match. Any total match values below this threshold may be discarded or treated as not being trackable to an identifiable asset.

The reconciliation task may select the best pair matches by employing any of various greedy algorithms where the highest point value pairs are selected first and where each successive selection removes one given assessment host from the remaining available assessment hosts to be matched. Additional selection algorithms configured to select best pair matches may also be used and are contemplated within the scope of the present invention. When the program has completely considered all pairs of this sorted match list, any remaining available discovered assessment host(s) may result in the creation of a new network asset where the newly created network asset maps to the assessment host which caused the new network asset.

Any new network assets for assessment hosts that did not match to existing network assets are added to the Machine_Assets table 1202 and mapped to the associated assessment hosts within the Asset_To_Discovered_Host table 1203.

In some embodiments, the assessment results originate from the multi-context event streaming network vulnerability scanner as described herein, but assessment results from a multitude of vulnerability and/or network scanners may be used and are contemplated within the scope of the present invention.

In some embodiments, the assessment results originate from third-party network vulnerability assessment scanners. For this case, the NSOC Business Logic Complex 102 provides a Scan Results Importation mechanism via an Application Programmer's Interface, API. When the results are imported, the system adds the assessment to the NSOC Database Complex 101 just as if it were scanned by the multi-context event streaming network vulnerability scanner. When the results for third-party scans are imported, the scan is set to a "ready for reconcile" state and reconcile matching proceeds as described in this document.

In some embodiments, it is possible for a human user to override entries in databases, and/or database tables such as Machine_Assets table 1202, or Asset_To_Discovered_Host table 1203. This feature may be useful in instances where a user is aware of an errant entry or mapping, or where the user wishes to update the tables for various other purposes.

Figure 17:
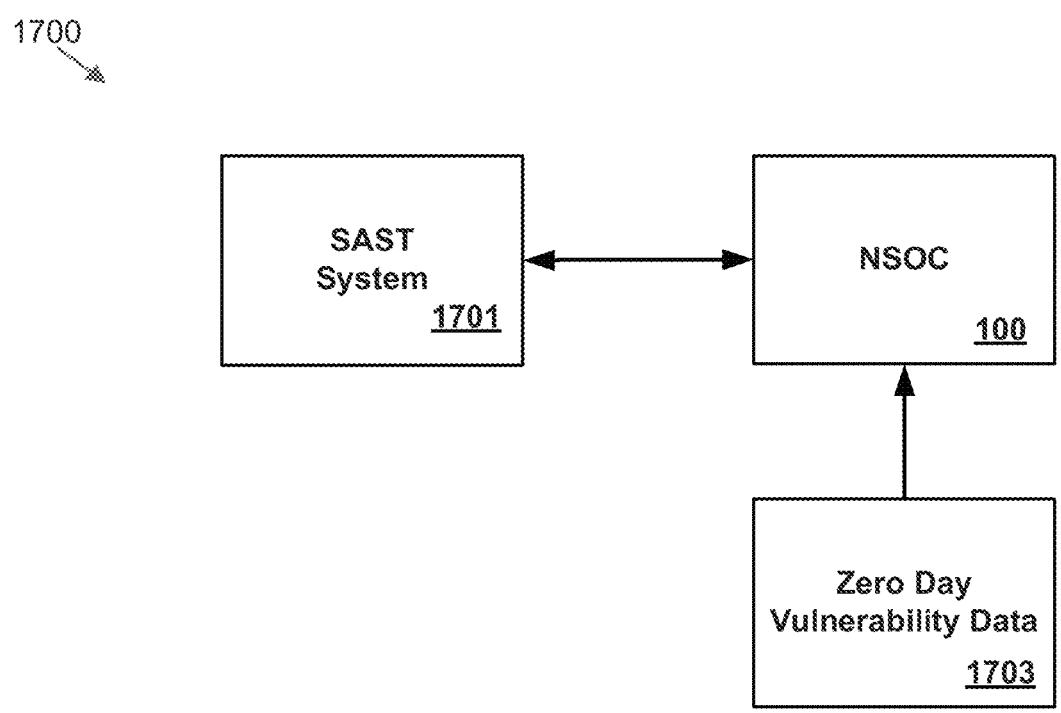
FIG. 17 is a schematic block diagram of a Vulnerability Management System interfacing with a Static Application Security Testing (SAST) system and a Zero Day Vulnerability Metadata Information Feed.

Reconciliation of Network Host Discovered Vulnerabilities, SAST Discovered Vulnerabilities and Zero Day Vulnerability Metadata FIG. 17 shows the Network Security Operations Center NSOC 100 interfacing with a Static Application Security Testing (SAST) system 1701 and a system which provides Zero Day Vulnerability data 1702, such as a Zero Day Vulnerability Metadata data feed. There are several companies within the internet security industry that offer SAST assessments and provide an API that allows a system such as an NSOC 100 to access and import such SAST assessments. In some cases, SAST systems allow a user to upload a software application that they want assessed into the SAST provider's system via a web interface. The user may then request a SAST assessment of that uploaded application. Once complete, results of the SAST assessment are stored within the SAST provider's product, or in the case of a cloud-based offering, stored at the provider's data center and/or in the cloud. The user may use the provider's web interface to view their SAST assessment results which may include security vulnerabilities for the assessed application.

Figure 18:
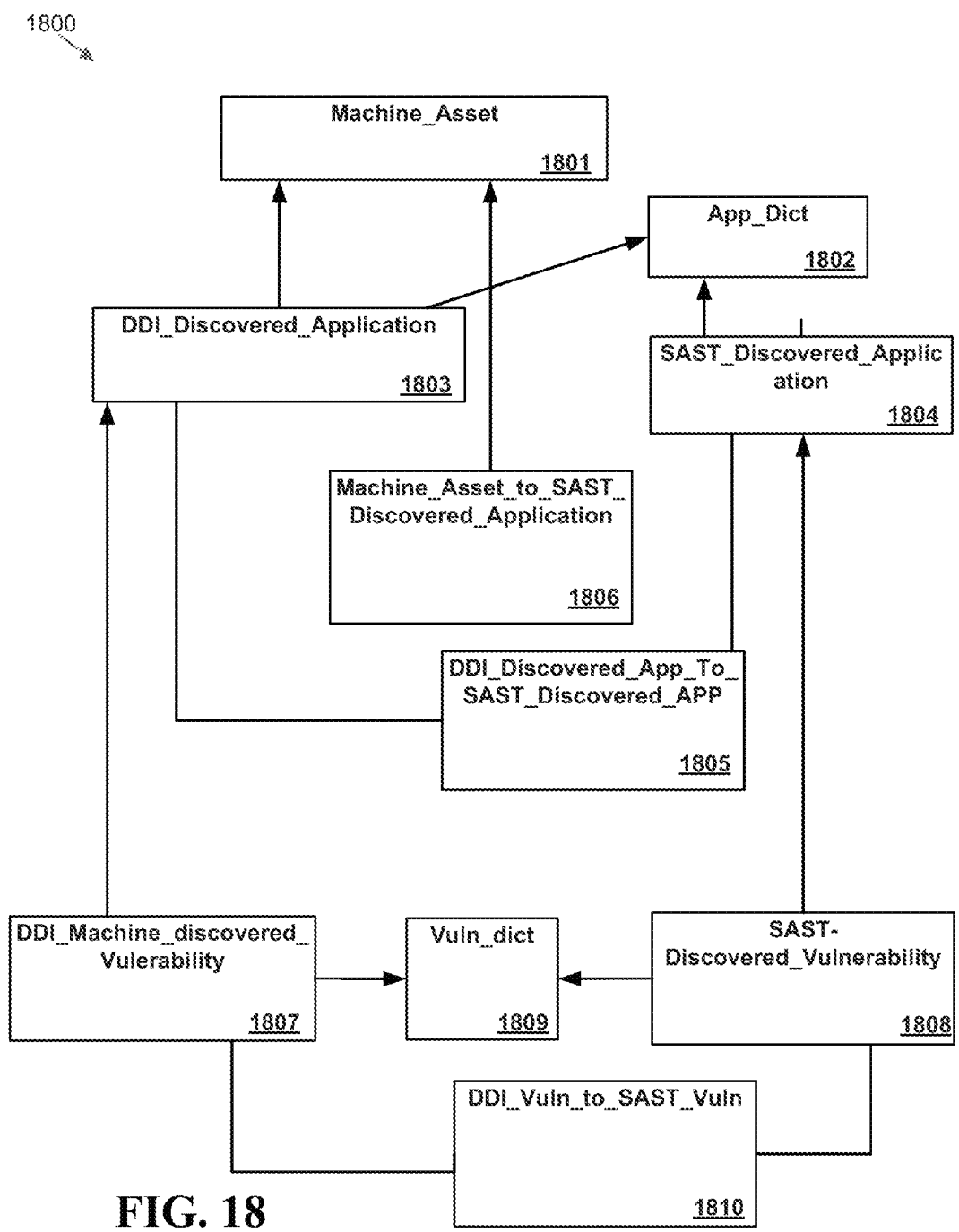
FIG. 18 is an entity relationship-diagram to relate an asset to discovered applications and vulnerabilities, to interrelate applications discovered using independent methods and to interrelate vulnerabilities discovered using independent methods.

In some embodiments of the NSOC 100, the NSOC 100 includes functionality that allows a user to import SAST assessment results into the NSOC 100 by using the web interface of the NSOC 100, provisioning credentials for their SAST account within the NSOC 100 and indicating a desire to pull SAST assessment data into the NSOC 100. The NSOC 100 may use the SAST API to interface with the SAST System 1701 and request the SAST assessment results. In some embodiments, for each SAST assessment imported into the NSOC 100, an entry is created in table SAST_Discovered_Application 1804 (discussed below in connection with FIG. 18) which may reside in the Database Complex 101.

In some embodiments, the NSOC 100 allows a user to associate the application that was assessed within the SAST System 1701, and imported into the NSOC 100, with one or more Machine Assets 1801 within the NSOC 100. In some embodiments the data relations required for this association are achieved by implementing the relationships depicted in the entity relationship diagram of FIG. 18 within the NSOC Database Complex 100.

In some embodiments, the NSOC 100 allows a user to manually associate an imported SAST assessment to one or more Machine Assets. When the manual association process is initiated, the NSOC 100 either associates the SAST-assessed application to a network vulnerability discovered application, or if none are found to match, it associates the SAST-assessed application directly to the Machine Asset. If the NSOC 100 finds a match for the SAST-assessed application to a network vulnerability discovered application, a new entry is added to the DDI_Discovered_App_To_SAST_Discovered_App 1805 and the primary keys of the DDI_Discovered_Application 1803 and the SAST_Discovered_Application 1804 form part of this new entry. If a match is not found, the NSOC 100 directly relates the SAST-assessed application to the Machine Asset by creating a new entry in the linking table Machine_Asset_To_SAST_Discoved_Application 1806 and including within this entry the primary keys for the Machine_Asset 1801 and the SAST_Discovered_Application 1804.

In some embodiments, the NSOC 100 allows a user to request a new launch of a SAST assessment for a given application directly from within the NSOC 100 system. For example, some embodiments would allow a user, by way of using the NSOC Web Interface, to examine a particular detected application which was detected by a network vulnerability scanner and which is represented by an entry in the DDI_Discovered_Application 1803 table for a given Machine Asset 1801. The user may from that same web page, request a new SAST assessment for the given network vulnerability assessment discovered application currently being examined. The NSOC 100 would then interface with the SAST system 1701 and request a launch of a new SAST assessment for the given application. This assumes the source code for the given application had been pre-uploaded to the SAST system 1701, or in some embodiments, the NSOC may make the source code available to the SAST system 1701. If the application software does not exist for the requested application within the SAST system 1701, the SAST system 1701 would return an error. If the software is available, the SAST System 1701 would initiate a SAST assessment and would return a SAST assessment ID back to the requesting NSOC 100. The NSOC 100 would then create a new entry in the SAST_Discovered_Application 1804 database table and use the returned SAST assessment ID as the SAST Assessment ID field for this new entry. In addition, because the request for a new SAST assessment was initiated from the NSOC for the given network vulnerability assessment discovered application, the NSOC 100 associates the newly-created SAST_Discovered_Application 1804 entry to the DDI_Discovered_Application 1803 entry by creating a new entry for the linking table DDI_Discovered_App_To_SAST_Discovered_App 1805 and using the primary keys of the two aforementioned tables as foreign keys within this new entry.

Further, in some embodiments, the NSOC 100 would automatically associate the SAST assessment findings to all other network discovered applications on other discovered network hosts within the NSOC active view for NSOC applications that have the same characteristics as the NSOC application which served as the one for which the user had requested a SAST assessment.

In some embodiments, when results for a SAST-assessed application are imported into the NSOC 100 and matched to a network vulnerability assessment discovered application, the NSOC 100 initiates a process whereby it determines the vulnerabilities that are common to these two.

Within the internet security industry, a SAST assessment identifies weaknesses within software in an automated fashion and determines a weakness category for the weaknesses it discovers. The weakness categories used have been determined by an open source community project known as Common Weakness Enumeration and which is sponsored by the Mitre Corporation. Each weakness category in uniquely identified with a CWE-ID identifier. SAST assessment tools within the internet security industry therefore associate each identified weakness with a SAST assessment, with a CWE-ID.

Within the internet security industry, network vulnerability assessment systems identify vulnerabilities in an automated fashion. Most network vulnerability assessment systems offered within the industry associate a given discovered vulnerability within each assessment, with a publicly-known vulnerability. Publicly known vulnerabilities are those that have been disclosed and/or discovered by security researchers and which are cataloged within a publicly available system managed by the Mitre Corporation called the Common Vulnerabilities and Exposures System. Each vulnerability within the CVE system is uniquely identified with a CVE-ID identifier. Each known vulnerability falls within a weakness category and therefore, each CVE-ID is associated with a CWE-ID. This association information is available within the CVE System.

In one embodiment, the information that is stored within the NSOC database for vulnerabilities that are discovered using network vulnerability scanning includes a CVE-ID and its associated CWE-ID and these are stored in the Vuln_Dict 1809 database table.

Figure 19:
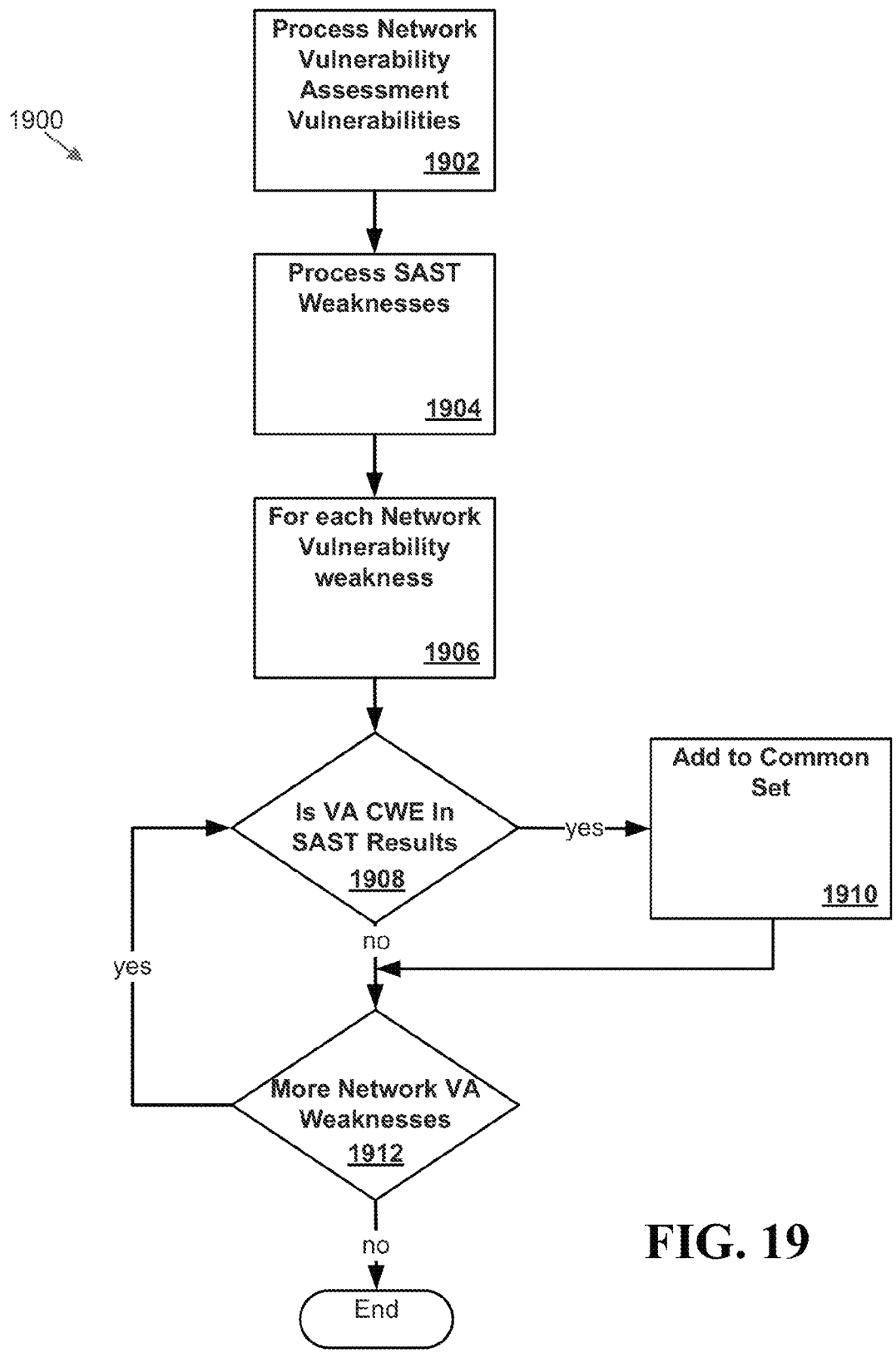
FIG. 19 is a flow chart diagram that shows a method for determining whether SAST weaknesses correlate with network vulnerabilities.

In one embodiment, the set of vulnerabilities that are common to both a imported SAST assessment and a network vulnerability assessment performed by an NSOC 100 is determined by matching the CWE-ID for weaknesses identified within the SAST assessment to the CWE-ID for the known vulnerabilities identified within the network vulnerability assessment. Note that this matching process may not be perfect in that a SAST assessment may find the same weakness with the same CWE-ID in multiple locations within the software. Therefore, any matching weakness that are discovered by way of network vulnerability assessment actually matches only one of the weaknesses found by the SAST assessment. The matching is achieved by way of Business Logic Complex 102. Turning to FIG. 19, the Business Logic complex begins the matching process 1900 by first retrieving the vulnerabilities within the Network Vulnerability Assessment 1902, and also retrieving the SAST assessment weaknesses from the SAST assessment results 1904. The Business Logic Complex 102 then cycles through each vulnerability's associated weakness CWE-ID 1906 and determines if this weakness ID is also part of the SAST results 1908. For any weakness ID that is found common to both sets, the given match is added to a common list 1910. If more network vulnerabilities are available, 1912, the process 1900 repeats the determination if there is a weakness ID that is common to both sets.

In one embodiment, the common set of vulnerabilities is determined as follows:

Once application code for a given application has been uploaded to the SAST system 1701 and a SAST assessment has been performed, the SAST then upon direction, "instruments" the code by inserting special profiling and logging instructions into the code segment for lines of code immediately preceding the at least some of the identified SAST weaknesses. Note that the functionality of the instrumented code, if encountered, will cause an output to a file or to memory and which includes the line of code representing the location of the vulnerability as identified by the SAST assessment. The user then downloads this newly instrumented code and load it onto the network host for which a network vulnerability scan is to be performed. The Host being scanned may require a restart (or at least the application on that host would require a restart).

Figure 20A:
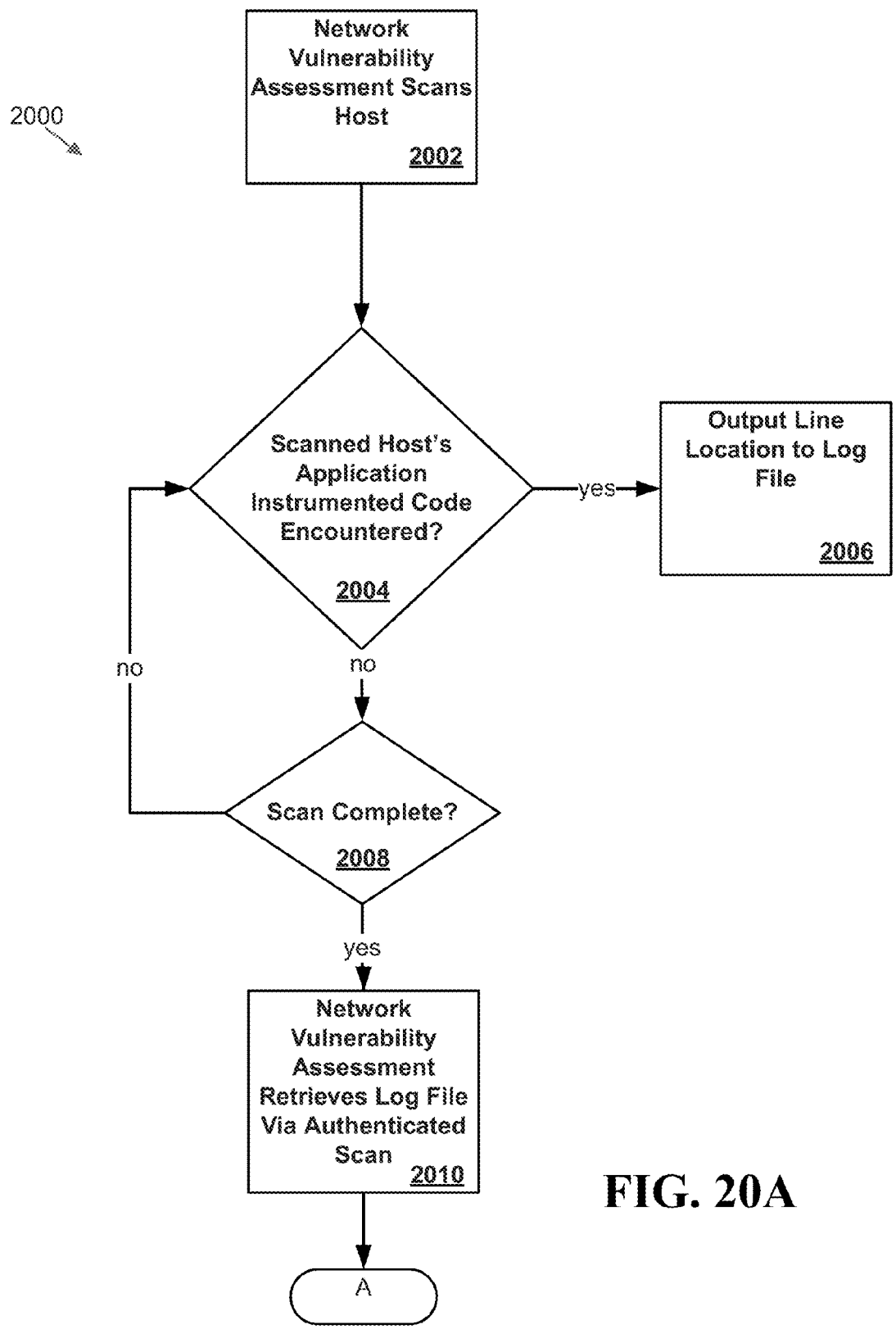
FIG. 20A-20B is a flow chart diagram that shows a method for determining whether SAST weaknesses correlate with network vulnerabilities by using instrumented code.

Turning to FIG. 20A, the NSOC begins the process 2000 by initiating a network vulnerability scan 2002 on the host running the instrumented software and runs its tests in order to detect vulnerabilities. If the instrumented code for the application within the scanned host where the SAST vulnerabilities have been determined is encountered 2004, the instrumented code causes log information to be output to a file resident on the scanned host 2006. At the end of the network scan assessment 2008, a final network vulnerability "test" which is an authenticated test, is launched and which authenticates to the host and which requests an upload to the network vulnerability scanner of the log file 2010 containing the results indicative of what instrumented code (identifiable by line number, for example) was encountered.

Figure 20B:
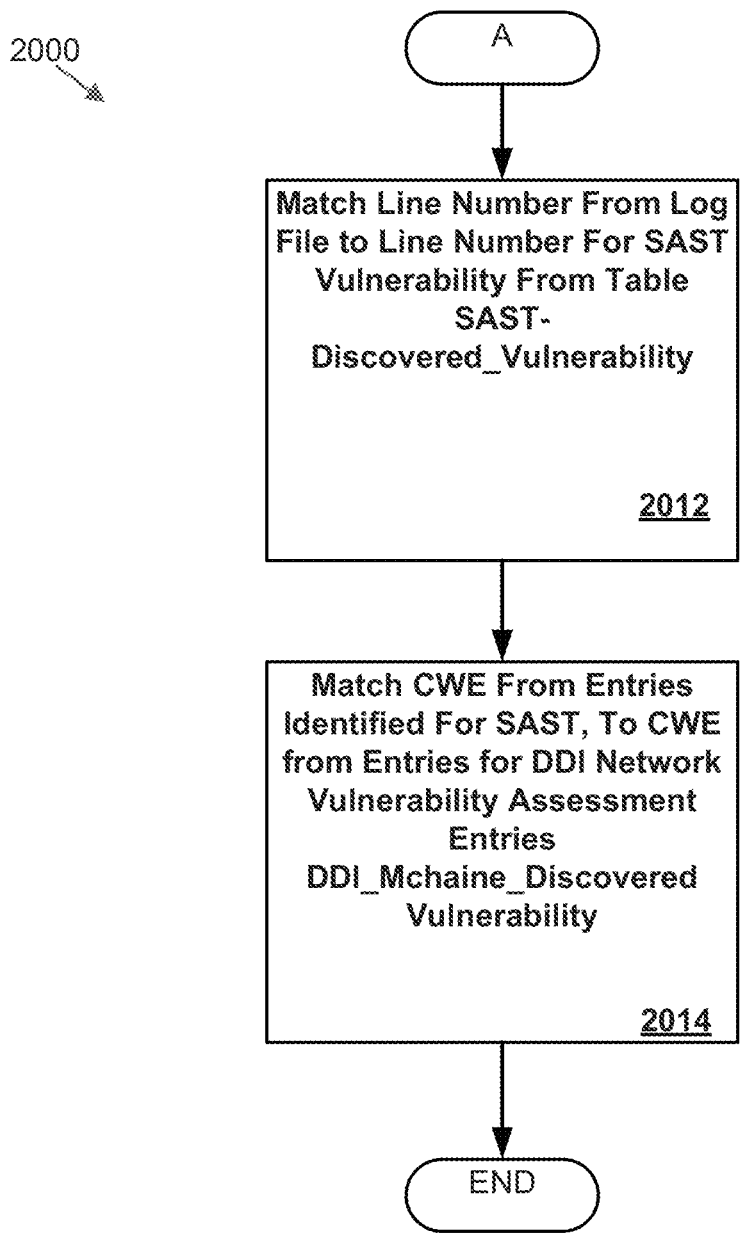

Turning back to FIG. 18, when the results for the network vulnerability assessment are inserted into the NSOC 100, the log file information is associated with the appropriate entry in the DDI_Discovered_Application 1803 entry. Once the SAST results are imported to the NSOC 100, the SAST-assessed application is matched to the appropriate DDI_Discovered_Application as previously described. As represented in FIG. 20B, the NSOC 100 may then precisely match 2012 SAST-discovered weakness to the network vulnerability assessment discovered vulnerabilities by identifying all entries in the SAST_Discovered_Vulnerability table 1808 that have the same source code line number as those present in the log file that has been associated to the DDI_Discovered_Application 1803 entry. Once these entries have been identified, they are then matched to the vulnerabilities that had been discovered by way of network vulnerability assessment by matching the identified SAST vulnerability CWE identifiers to the CWE identifiers 2014 for the network vulnerability assessment findings that are stored in the DDI_Machine_Discovered_Vulnerability 1807. The results may be stored in the DDI_Vuln_to_SAST_Vuln table 1810.

The Vulnerability Manager NSOC 100 includes the ability to import newly discovered vulnerabilities that have not yet been documented within Mitre or which do not yet have a CVE identifier assigned (i.e. zero day vulnerabilities). The metadata imported may include information on the type of vulnerability, a description of the vulnerability, and an associated application, hardware and operating system for which the vulnerability applies. Once imported, the NSOC 100 may identify previously-scanned applications as possible candidates which may be subject to the new vulnerabilities. The NSOC may then highlight these possible issues to users who are responsible for managing the security of their systems. In one embodiment, the NSOC allows a user to manually associate a given new vulnerability with a computer asset that has been identified during a network vulnerability assessment. In one embodiment, the NSOC allows a user to manually associate a new vulnerability to one of the vulnerabilities identified within an imported SAST assessment.

Realizing that a given vulnerability may be discovered by several selected technologies, determining the true set of unique vulnerabilities that has been detected by the various independent technologies is essential in order to determine the vulnerabilities contributing to the true security risk of the network devices for which the vulnerabilities pertain.

Some embodiments include a non-transitory computer-readable medium that includes computer-readable code that, when executed by a computer, causes a computer to perform at least one embodiment of the present methods. The non-transitory computer-readable medium may be, for example, a CD-ROM, a DVD-ROM, a flash drive, a hard drive or any other physical storage device.

In some methods, a non-transitory computer-readable medium is created. In some embodiments, the method may include recording the computer readable medium with computer readable code that, when executed by a computer, causes the computer to perform at least one embodiment of the present methods. Recording the computer readable medium may include, for example, burning data onto a CD-ROM or a DVD-ROM, or otherwise populating a physical storage device with the data.

All of the methods disclosed and claimed herein can be made and executed without undue experimentation in light of the present disclosure. While the apparatus, systems, and methods of this invention have been described in terms of preferred embodiments, it will be apparent to those of skill in the art that variations may be applied to the methods and in the steps or in the sequence of steps of the method described herein without departing from the concept, spirit and scope of the invention. For example, a context finding may refer to a particular vulnerability; however, a context finding may also refer to more generic of information such as a host IP address. In addition, modifications may be made to the disclosed apparatuses, systems, and methods and components may be eliminated or substituted for the components described herein where the same or similar results would be achieved. All such similar substitutes and modifications apparent to those skilled in the art are deemed to be within the scope of the invention as defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method comprising:
    receiving in computer memory a SAST assessment for a software application;
    receiving in computer memory the software application;
    instrumenting the software application based on the SAST assessment, wherein instrumenting the software application comprises inserting at least one instruction in the software application;
    loading the instrumented software application on a network host;
    executing the instrumented software application on the network host, wherein an output from an instrumented portion of the software application is outputted when the instrumented portion of the software application is executed on the network host, wherein the output is entered in a log file on the network host, and wherein the entry in the log file identifies a location of the instrumented portion within the software application;
    performing a network vulnerability scan on the network host and creating a network vulnerability assessment based on the results of the network vulnerability scan;
    receiving in computer memory at least one output from an instrumented and executed portion of the software application; and
    correlating at least one item in the SAST assessment with at least one item in the network vulnerability assessment based on the at least one output by associating a location of the instrumented and executed portion of the software application within the software application, as determined by the at least one output, and a test program performed during the network vulnerability scan.

2. The method of claim 1, where the location is identified by line number.

3. A non-transitory computer-readable medium comprising instructions, that when executed by a processor, cause the processor to perform the steps comprising:
    receiving in computer memory a SAST assessment for a software application;
    receiving in computer memory the software application;
    instrumenting the software application based on the SAST assessment, wherein instrumenting the software application comprises inserting at least one instruction in the software application;
    loading the instrumented software application on a network host;
    executing the instrumented software application on the network host, wherein an output from an instrumented portion of the software application is outputted when the instrumented portion of the software application is executed on the network host, wherein the output is entered in a log file on the network host, and wherein the entry in the log file identifies a location of the instrumented portion within the software application;
    performing a network vulnerability scan on the network host and creating a network vulnerability assessment based on the results of the network vulnerability scan;
    receiving in computer memory at least one output from an instrumented portion of the software application; and
    correlating at least one item in the SAST assessment with at least one item in the network vulnerability assessment based on the at least one output by associating a location of the instrumented and executed portion of the software application within the software application, as determined by the at least one output, and a test program performed during the network vulnerability scan.

4. The non-transitory computer-readable medium of claim 3, where the location is identified by line number.

* * * * *